US012781563B2

(12) United States Patent
Sperandio et al.

(10) Patent No.: US 12,781,563 B2
(45) **Date of Patent: *Nov. 3, 2026**

(54) FENESTRATION UNIT INCLUDING SLIDABLE GLASS PANELS

(71) Applicant: Quaker Window Products Co., Freeburg, MO (US)

(72) Inventors: David Sperandio, Freeburg, MO (US); David Harrell, Columbus, IN (US); Kevin Blansett, Jefferson City, MO (US); Curtis Weavers, Vienna, MO (US)

(73) Assignee: QUAKER WINDOW PRODUCTS CO., Freeburg, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/600,137

(22) Filed: Mar. 8, 2024

(65) Prior Publication Data

US 2024/0209680 A1 Jun. 27, 2024

Related U.S. Application Data

(63) Continuation of application No. 17/466,523, filed on Sep. 3, 2021, now Pat. No. 11,946,313.

(Continued)

(51) Int. Cl.

*E06B 3/964* (2006.01)
*E06B 1/70* (2006.01)

(Continued)

(52) U.S. Cl.

CPC .............. *E06B 3/9642* (2013.01); *E06B 1/70* (2013.01); *E06B 3/4636* (2013.01); *E06B 3/469* (2013.01); *E06B 3/9612* (2013.01); *E06B 7/26* (2013.01)

(58) Field of Classification Search

CPC ...... E06B 3/4636; E06B 3/469; E06B 3/9642; E06B 3/9612; E06B 1/70; E06B 1/702; E06B 1/705; E06B 2001/628; E06B 7/26

See application file for complete search history.

(56) References Cited

U.S. PATENT DOCUMENTS 2,841,390 A 7/1958 Urquhart
3,204,324 A 9/1965 Fridthjov (Continued)

FOREIGN PATENT DOCUMENTS

CA 1143140 A 3/1983
CA 1157247 A 11/1983

(Continued)

OTHER PUBLICATIONS

Western Windows (webpage), "Western Windows Systems Product Guide", pdf printed Jun. 22, 2021, 63 pps. URL: https://www.westernwindowsystems.com/sites/default/files/2019-07/Western-Window_Systems-Product_Guide-V6.2.

(Continued)

*Primary Examiner* — Marcus Menezes
(74) *Attorney, Agent, or Firm* — Armstrong Teasdale LLP

(57) ABSTRACT

A fenestration unit includes a first glass unit, a first panel frame, a second glass unit, a second panel frame, a sill flashing, and a frame. The frame includes a header, jambs, and a frame sill including a first track and a second track. The first panel frame and the first glass unit are slidable along the first track when positioned in the frame. The second panel frame and the second glass unit are slidable along the second track when positioned in the frame. The sill flashing includes a base extending under the first and second tracks and a wall extending upward from the base to inhibit moisture intrusion through the fenestration unit. The frame (Continued)

sill is removable from the frame without disassembling the sill flashing, the jambs, and the header.

17 Claims, 21 Drawing Sheets

Related U.S. Application Data

(60) Provisional application No. 62/706,708, filed on Sep. 4, 2020.

(51) Int. Cl.
*E06B 3/46* (2006.01)
*E06B 3/96* (2006.01)
*E06B 7/26* (2006.01)

(56) References Cited

U.S. PATENT DOCUMENTS

| | | | | |
|---|---|---|---|---|
| 3,425,160 | A | 2/1969 | Petterborg | |
| 3,798,869 | A | 3/1974 | Nipp | |
| 3,823,524 | A | 7/1974 | Weinstein | |
| 3,967,412 | A * | 7/1976 | Governale | E06B 1/70 49/468 |
| 4,067,163 | A | 1/1978 | Hetman | |
| 4,098,027 | A * | 7/1978 | Crance | E06B 3/4609 160/90 |
| 4,257,202 | A | 3/1981 | Biro | |
| 4,323,218 | A | 4/1982 | Plum | |
| 4,330,919 | A | 5/1982 | Bischlipp et al. | |
| 4,342,144 | A | 8/1982 | Doguchi | |
| 4,423,578 | A | 1/1984 | Meigs et al. | |
| 4,497,103 | A | 2/1985 | Hosooka et al. | |
| 4,649,682 | A | 3/1987 | Barrett, Jr. | |
| 4,694,552 | A | 9/1987 | Ecker et al. | |
| 5,022,205 | A | 6/1991 | Ford | |
| 5,058,351 | A | 10/1991 | Dunstan | |
| 5,130,404 | A | 7/1992 | Freeland | |
| 5,187,867 | A | 2/1993 | Rawlings | |
| 5,371,946 | A | 12/1994 | Cameron et al. | |
| 5,424,111 | A | 6/1995 | Farbstein | |
| 5,454,204 | A | 10/1995 | Jordal | |
| D372,540 | S | 8/1996 | Pollard | |
| 5,554,713 | A | 9/1996 | Freeland | |
| 5,577,951 | A | 11/1996 | Jabcon, Jr. | |
| 6,098,355 | A | 8/2000 | Li | |
| 6,371,188 | B1 * | 4/2002 | Baczuk | E06B 7/14 49/467 |
| 6,405,498 | B1 | 6/2002 | Riegelman | |
| 6,500,550 | B1 | 12/2002 | Tsuboi et al. | |
| 6,830,705 | B1 | 12/2004 | Freeland et al. | |
| 7,096,640 | B1 | 8/2006 | Chevian et al. | |
| 7,246,411 | B2 | 7/2007 | Campbell et al. | |
| 7,600,346 | B2 * | 10/2009 | Meeks | E06B 1/70 49/467 |
| 8,074,699 | B2 | 12/2011 | Jones et al. | |
| D669,770 | S | 10/2012 | Lapping et al. | |
| 8,322,090 | B2 | 12/2012 | Masanori et al. | |
| 8,381,445 | B2 | 2/2013 | Hans | |
| 8,776,443 | B2 | 7/2014 | Bienick | |
| 9,068,344 | B2 | 6/2015 | McKenna | |
| 9,328,549 | B1 | 5/2016 | Alexander et al. | |
| 9,441,412 | B1 | 9/2016 | Hooper, Jr. et al. | |
| 9,470,028 | B2 | 10/2016 | Header et al. | |
| 9,593,222 | B2 | 3/2017 | Taylor et al. | |
| 9,963,923 | B2 | 5/2018 | Jetzinger et al. | |
| 10,370,893 | B2 | 8/2019 | Hooper, Jr. et al. | |
| 10,900,273 | B1 | 1/2021 | Salvoni | |
| 10,961,769 | B2 * | 3/2021 | Vos | E06B 1/62 |
| 11,946,313 | B2 * | 4/2024 | Sperandio | E06B 1/70 |
| 2006/0086052 | A1 | 4/2006 | Petta et al. | |
| 2009/0025325 | A1 | 1/2009 | Gillespie et al. | |
| 2009/0165406 | A1 * | 7/2009 | Campbell | E06B 7/14 52/211 |
| 2009/0272045 | A1 | 11/2009 | Teodorovich | |
| 2010/0115850 | A1 | 5/2010 | Siodla et al. | |
| 2016/0040474 | A1 | 2/2016 | Geng | |
| 2018/0148975 | A1 | 5/2018 | Roberts et al. | |
| 2020/0199912 | A1 | 6/2020 | Meyer et al. | |
| 2020/0224486 | A1 | 7/2020 | Anderson et al. | |
| 2020/0408016 | A1 | 12/2020 | Hernandez | |

FOREIGN PATENT DOCUMENTS

| | | | |
|---|---|---|---|
| CA | 2166593 | A1 | 7/1997 |
| CA | 2101672 | C | 12/1997 |
| CA | 2928657 | C | 2/2017 |
| CN | 1195738 | A | 10/1998 |
| CN | 102031914 | A | 4/2011 |
| CN | 101377113 | B | 12/2011 |
| CN | 102953632 | A | 3/2013 |
| CN | 203050387 | U | 7/2013 |
| CN | 103480683 | B | 7/2015 |
| CN | 104908194 | B | 6/2018 |
| CN | 109482666 | A | 3/2019 |
| CN | 110094137 | A | 8/2019 |
| DE | 19818769 | A1 | 11/1999 |
| DE | 19818769 | C2 | 7/2001 |
| EP | 1126122 | B1 | 4/2004 |
| GB | 2133824 | A | 8/1984 |
| GB | 2150181 | A | 6/1985 |
| GB | 2523638 | B | 5/2016 |
| JP | 3232047 | B2 | 11/2001 |
| JP | 2015168937 | A | 9/2015 |
| KR | 20190087926 | A | 7/2019 |
| KR | 102085158 | B1 | 5/2020 |
| KR | 20220002604 | U | 11/2022 |
| WO | 2008029394 | A2 | 3/2008 |
| WO | 2013022160 | A1 | 2/2013 |
| WO | 2019090133 | A1 | 5/2019 |

OTHER PUBLICATIONS

Panda Windows and Doors (webpage), Multi-Slide Doors overview, pdf printed Jun. 22, 2021, 6 pps. URL: https://www.panda-windows.com/multi-slide-doors/?keyword=Multi%20Slide%20Doors&matchtype=p&network=o&device=c&msclkid=d81ab87df31f14b952f8e7573b82e9e4.
Panda Windows and Doors, Multi-Slide Doors brochure, pdf printed Jun. 22, 2021, 8 pps.
Marvin, Multi-Slide Doors overview, pdf printed Jun. 22, 2021, 6 pps. URL: https://www.marvin.com/products/collections/signature/ultimate/multi-slide-door.
Quaker Window Company designs for Contemporary Glide wood sliding door, Oct. 2001, 2 pages.
Quaker Window Company designs for French Glide wood sliding door, Oct. 2001, 2 pages.
Quaker Window Company designs for M-800 sliding patio door-aluminum, Feb. 1998, 2 pages.
Quaker Window Company designs for M-1100 sliding patio door-aluminum, Feb. 1998, 2 pages.
Quaker Window Company designs for M-2000 sliding patio door-aluminum, Feb. 1998, 2 pages.
Quaker Window Company designs for Vinyl Glide 2 Panel sliding patio door, Feb. 1998, 2 pages.
Quaker Window Company V100 Sliding Door Booklet, May 2021, 2 pages.
Quaker Window Company Manchester Sliding Door Booklet, Jun. 2019, 3 pages.
Quaker Window Company M700 Sliding Door Booklet, Aug. 20, 2020, 3 pages.
Quaker Window Company M300 Sliding Door Booklet, Jul. 2019, 9 pages.
Quaker Window Company Crusader Sliding Door Booklet, Jun. 2019, 3 pages.
Quaker Window Company Brighton Sliding Door Narrow booklet, Jan. 2019, 5 pages.

(56) References Cited

OTHER PUBLICATIONS

Quaker Window Company Brighton Sliding Door French Rail booklet, Jan. 2019, 5 pages.
Quaker Window Company M600 booklet, Jul. 2019, 4 pages.
Quaker Window Company AdvantEdge Sliding Door booklet, Jun. 2019, 6 pages.
Quaker Window Company ModernVu Standard booklet, Jan. 2018, 6 pages.
Quaker Window Company ModernVu Sliding Door OX product sheets, Mar. 11, 2021, 3 pages.
AAMA TIR-A8-16, Structural Performance of Composite Thermal Barrier Framing Systems, Sep. 2016, American Architectural Manufacturers Association, Schaumburg, IL.

* cited by examiner

FENESTRATION UNIT INCLUDING SLIDABLE GLASS PANELS

CROSS-REFERENCE TO RELATED APPLICATION

This application is a continuation application of U.S. patent application Ser. No. 17/466,523, filed on Sep. 3, 2021, which claims priority to U.S. Provisional Patent Application Ser. No. 62/706,708, filed on Sep. 4, 2020, the disclosures of which are hereby incorporated by reference in its entirety.

FIELD

The field relates to building components and, in particular, fenestration units such as windows and doors that include slidable glass panels.

BACKGROUND

Fenestration units such as windows and glass doors typically include a frame supporting one or more glass panes. The frame may be constructed of various materials that provide structural strength or a desired aesthetic appearance. Some windows and glass doors include one or more glass panels that are slidable along tracks defined by the frame. The frame may include multiple pieces that are attached together at joints to form the tracks. The windows and glass doors may be difficult to assemble and properly seal against moisture intrusion because the tracks are attached together at joints. In addition, the frames including joints and multiple pieces may affect the aesthetic appearance of the windows and glass doors.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a fenestration unit includes a first glass unit, a first panel frame circumscribing the first glass unit, a second glass unit, a second panel frame circumscribing the second glass unit, a sill flashing, and a frame. The frame circumscribes the first panel frame and the second panel frame. The frame includes a header, jambs, and a frame sill including a first track and a second track. The first panel frame and the first glass unit are slidable along the first track when positioned in the frame. The second panel frame and the second glass unit are slidable along the second track when positioned in the frame. The sill flashing includes a base extending under the first and second tracks and a wall extending upward from the base to inhibit moisture intrusion through the fenestration unit. The frame sill is removable from the frame without disassembling the sill flashing, the jambs, and the header.

In another aspect, a method of assembling a fenestration unit includes installing a sill flashing and jambs in an opening. The method further includes positioning a frame sill on the jambs. The frame sill includes a first track and a second track. A first panel frame and a first glass unit are slidable along the first track. A second panel frame and a second glass unit are slidable along the second track. The sill flashing includes a base extending under the first and second tracks and a wall extending upward from the base to inhibit moisture intrusion through the fenestration unit. The frame sill is removable from the frame without disassembling the sill flashing and the jambs.

In yet another aspect, a frame for a fenestration unit includes a header and jambs. The frame also includes a sill system including a sill flashing and a frame sill positioned on the sill flashing. The frame sill includes tracks. The slidable panels are slidable along the tracks when positioned in the frame. The sill flashing includes a base extending under the tracks and a wall extending upward from the base to inhibit moisture intrusion through the fenestration unit. The frame sill is removable from the frame without disassembling the sill flashing, the jambs, and the header.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
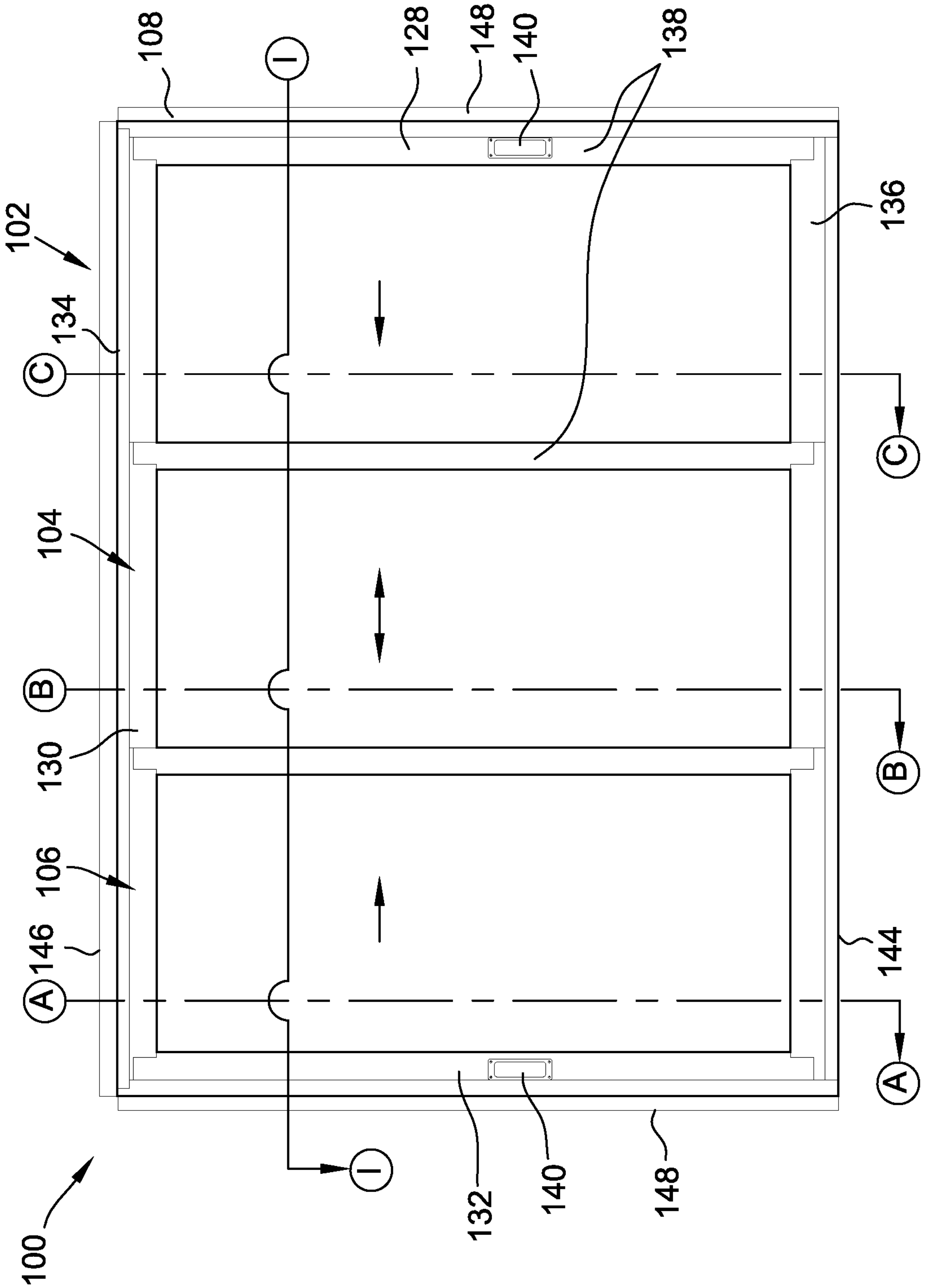
FIG. 1 is an elevation view of an example door.
Figure 2:
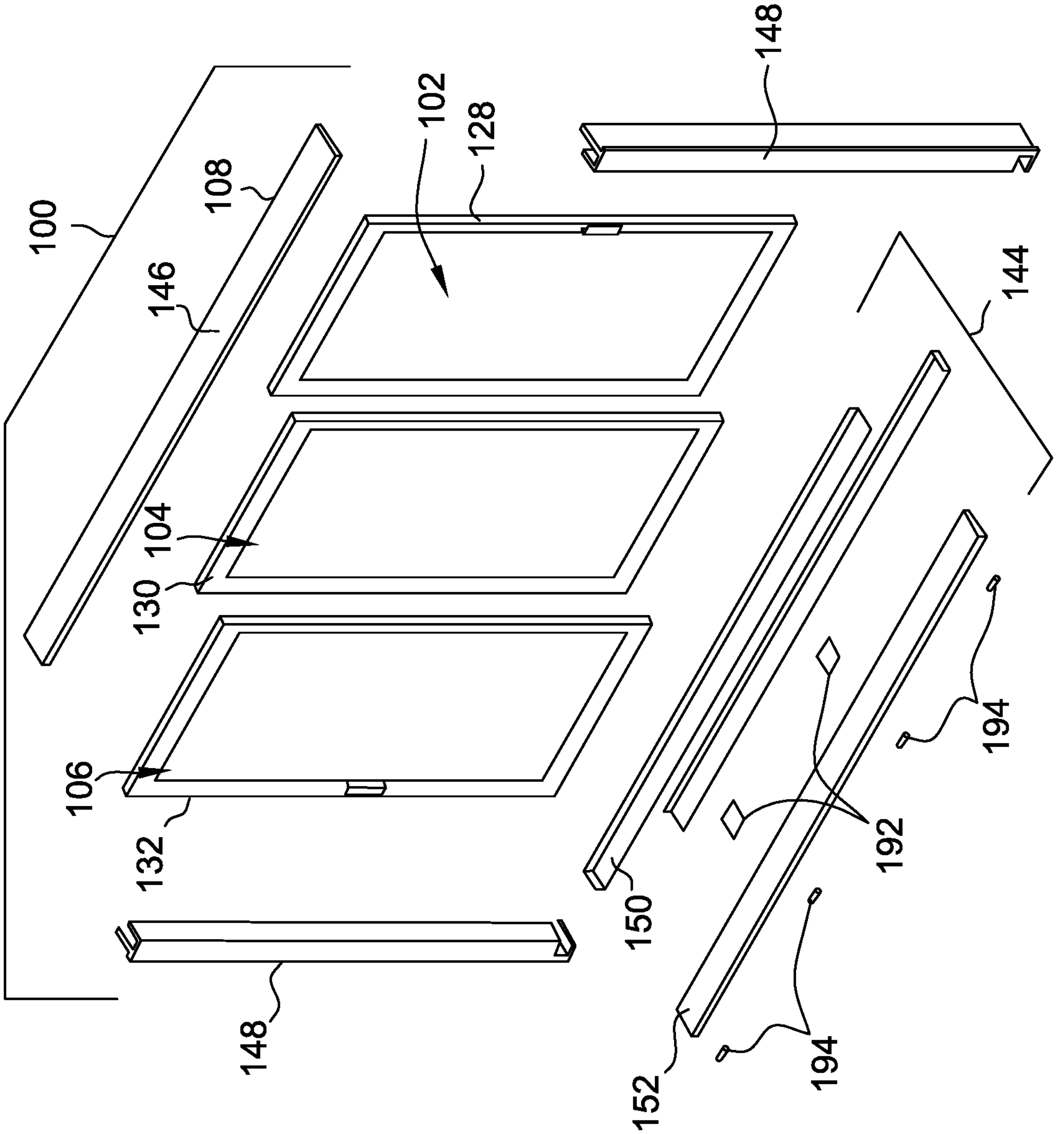
FIG. 2 is an exploded assembly view of the door shown in FIG. 1.
Figure 3:
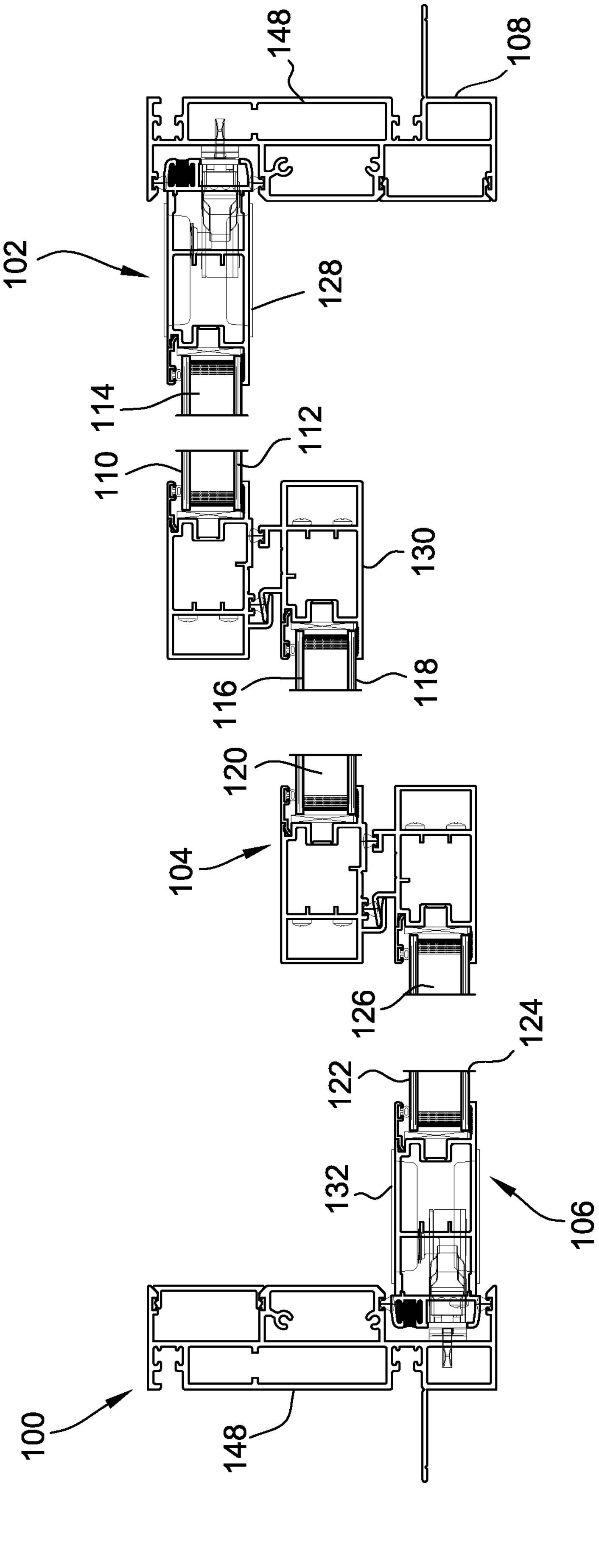
FIG. 3 is a sectional foreshortened view of the door shown in FIG. 1, taken along section line I-I.
Figure 4:
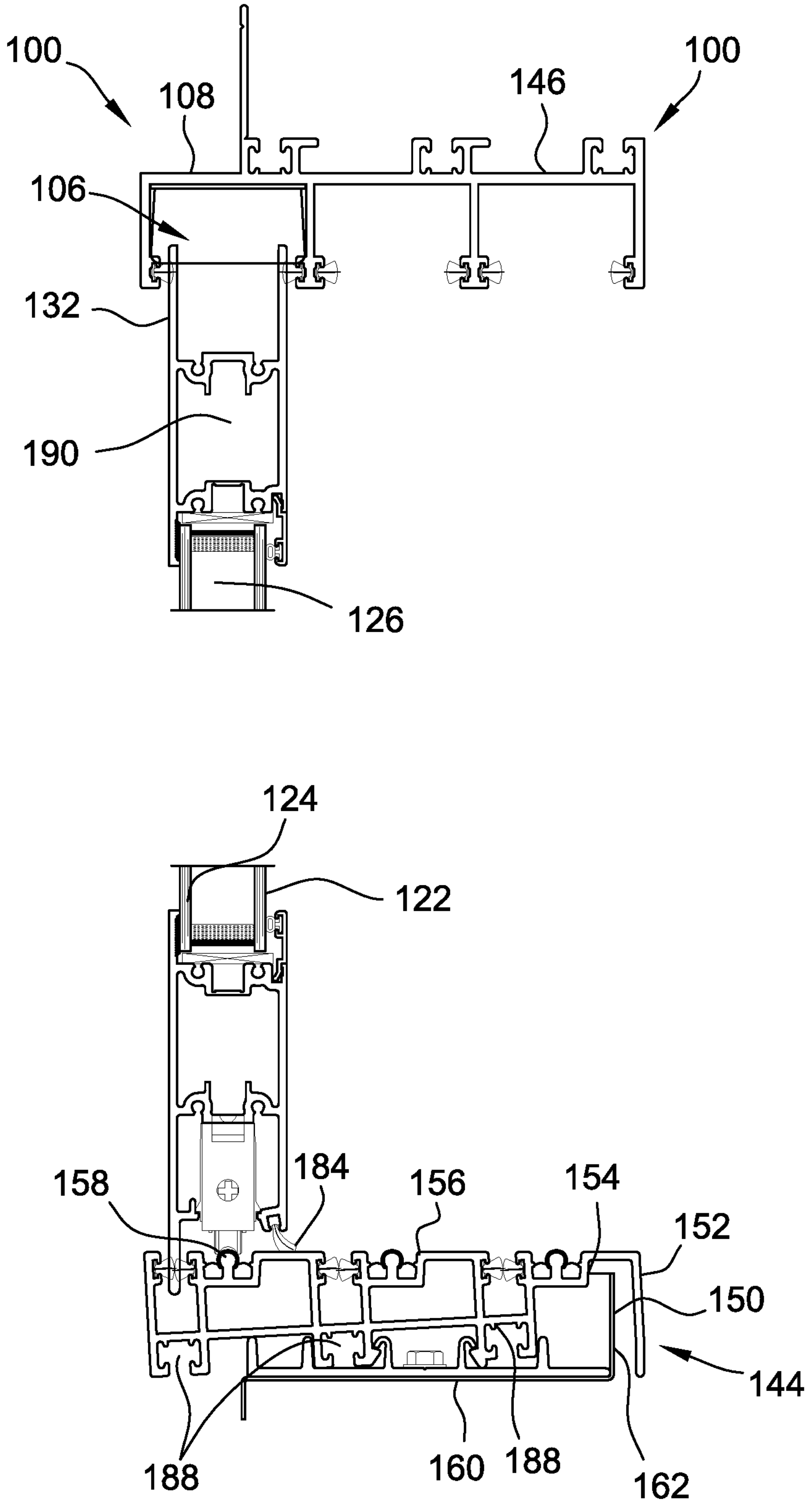
FIG. 4 is a sectional foreshortened view of the door shown in FIG. 1, taken along section line A-A.
Figure 5:
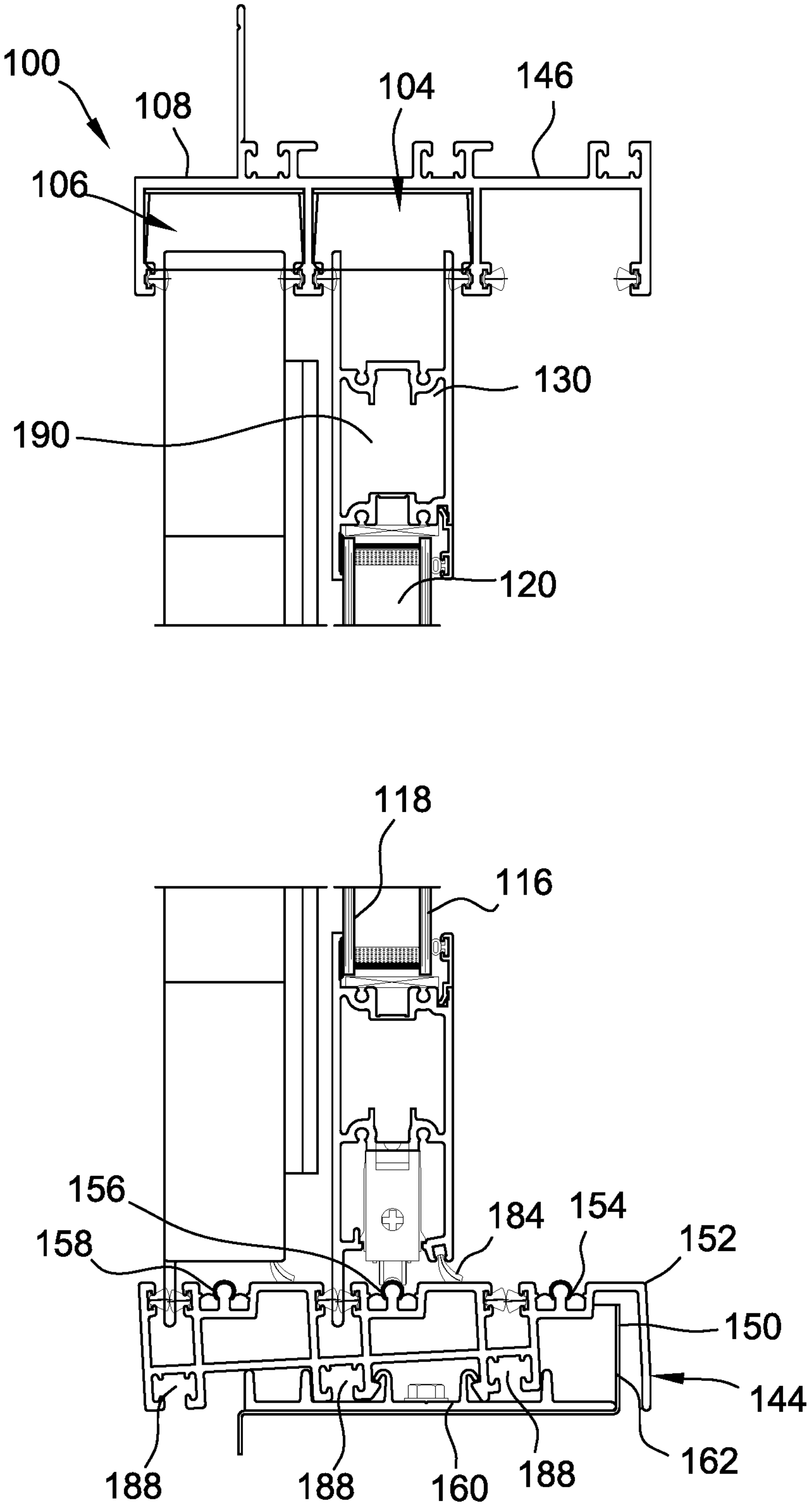
FIG. 5 is a sectional foreshortened view of the door shown in FIG. 1, taken along section line B-B.
Figure 6:
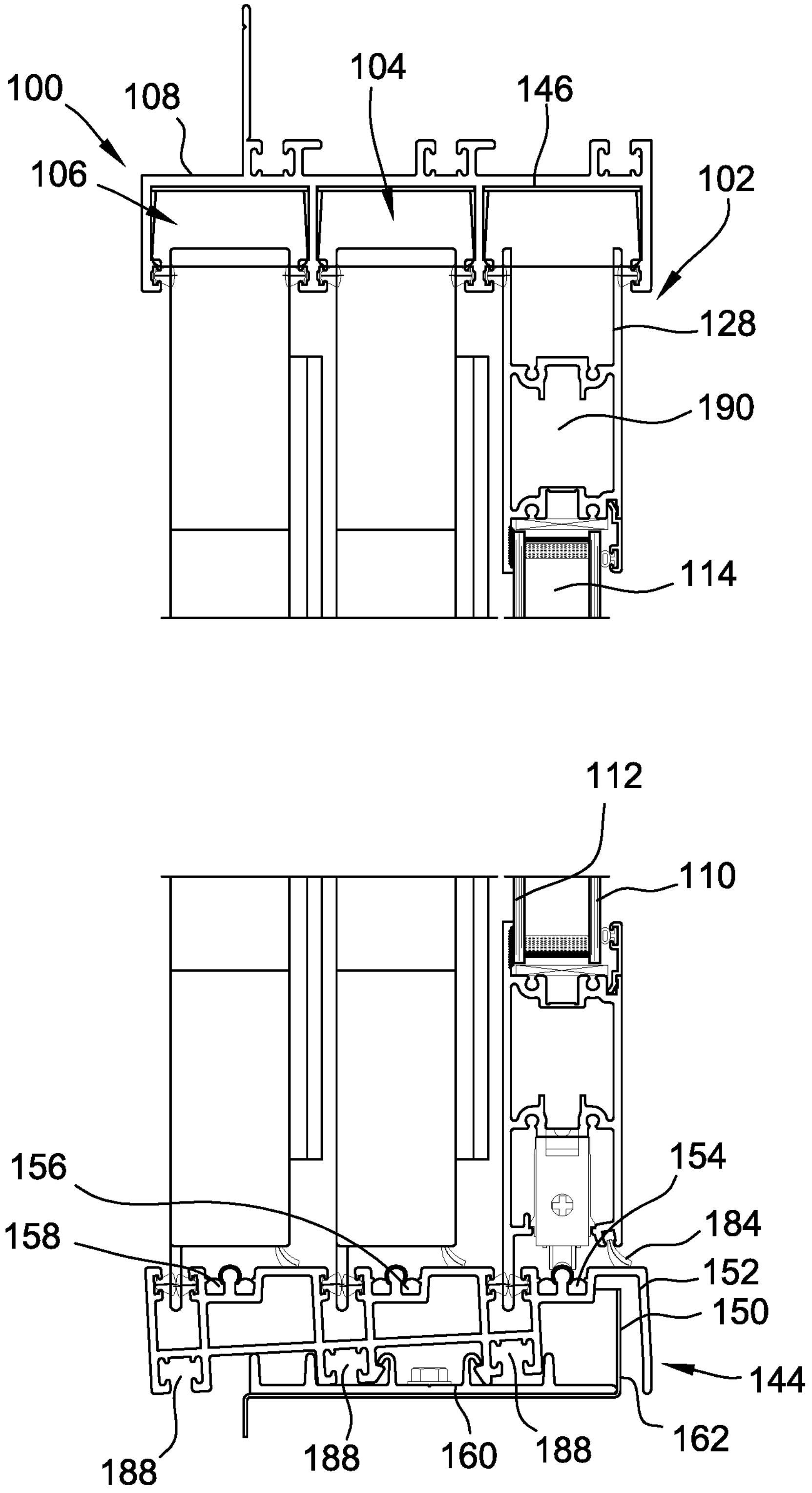
FIG. 6 is a sectional foreshortened view of the door shown in FIG. 1, taken along section line C-C.
Figure 7:
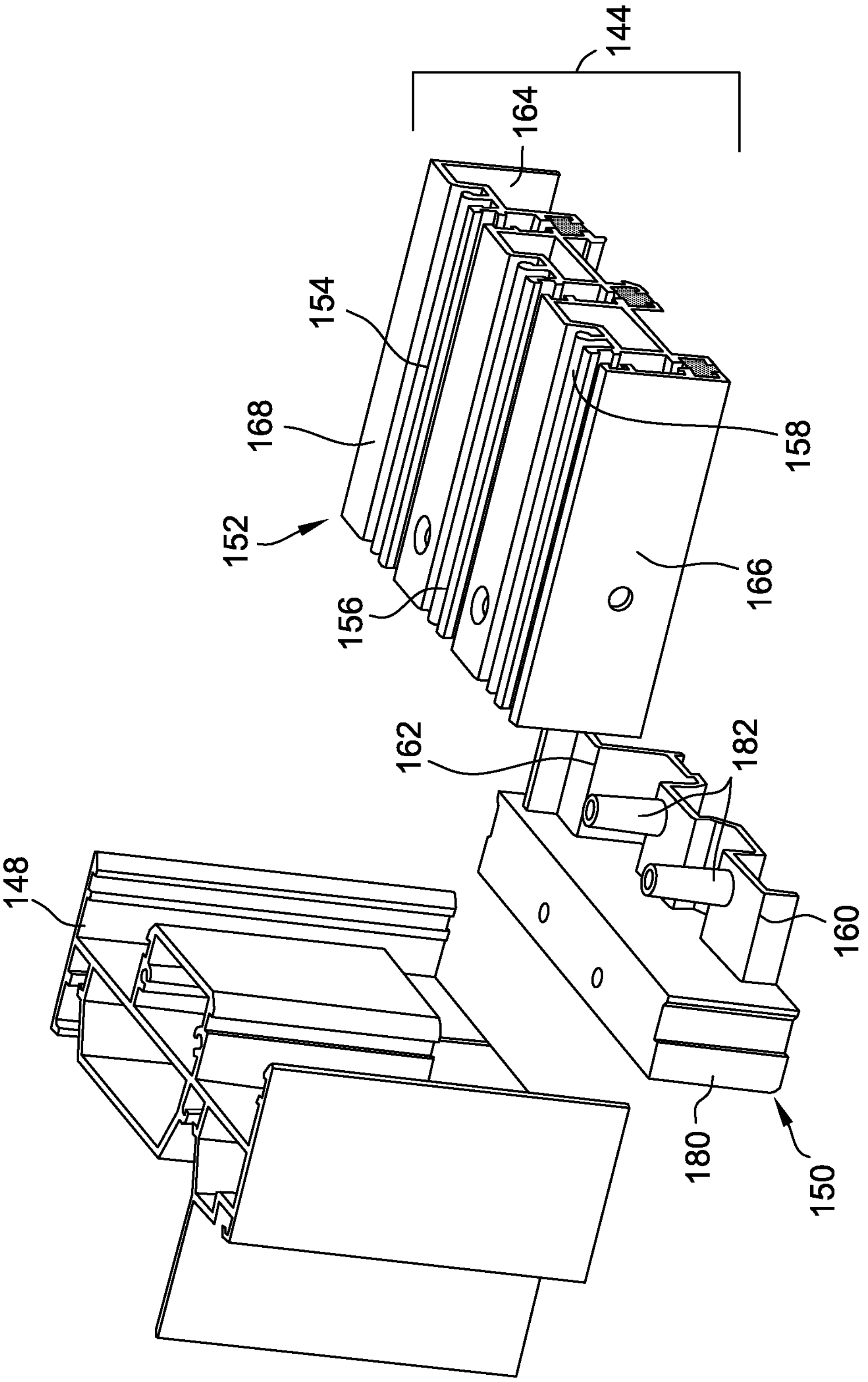
FIG. 7 is an exploded assembly view of a portion of the door shown in FIG. 1.
Figure 8:
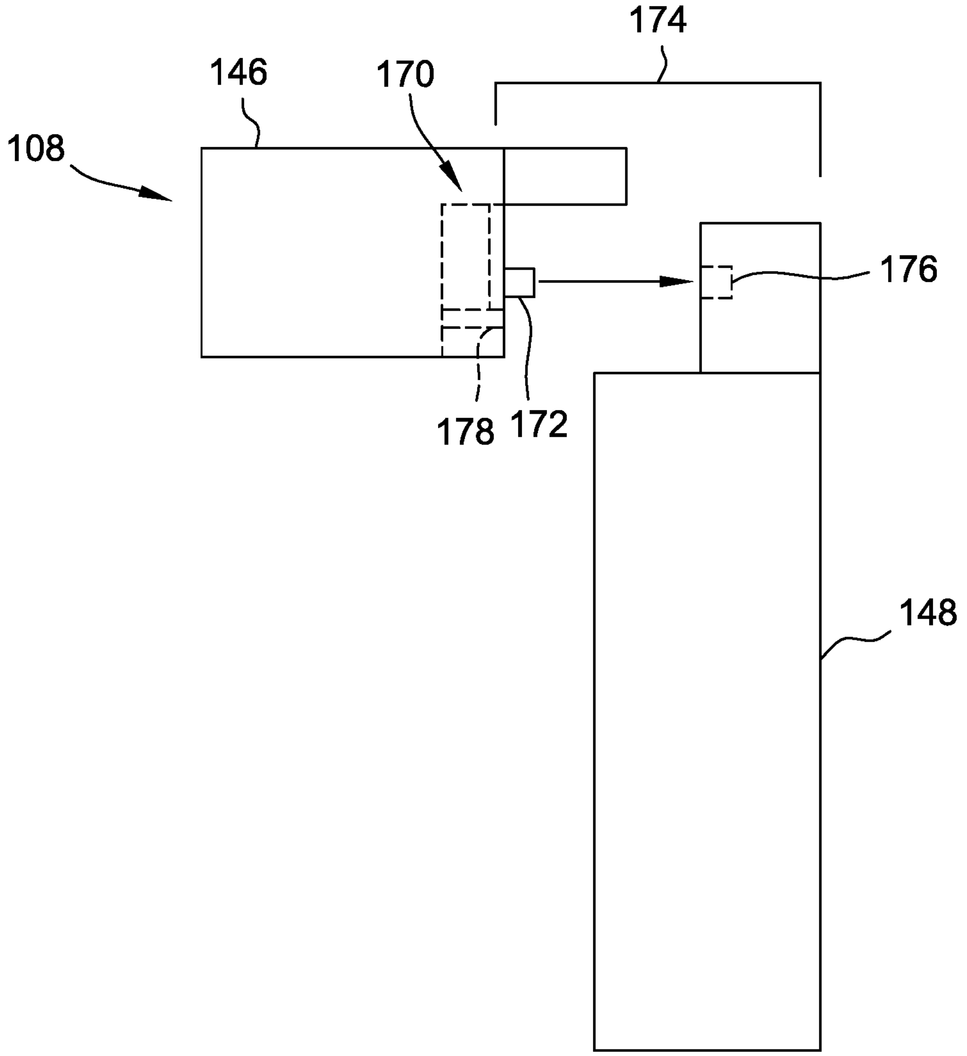
FIG. 8 is an exploded assembly view of a corner joint of the door shown in FIG. 1.
Figure 9:
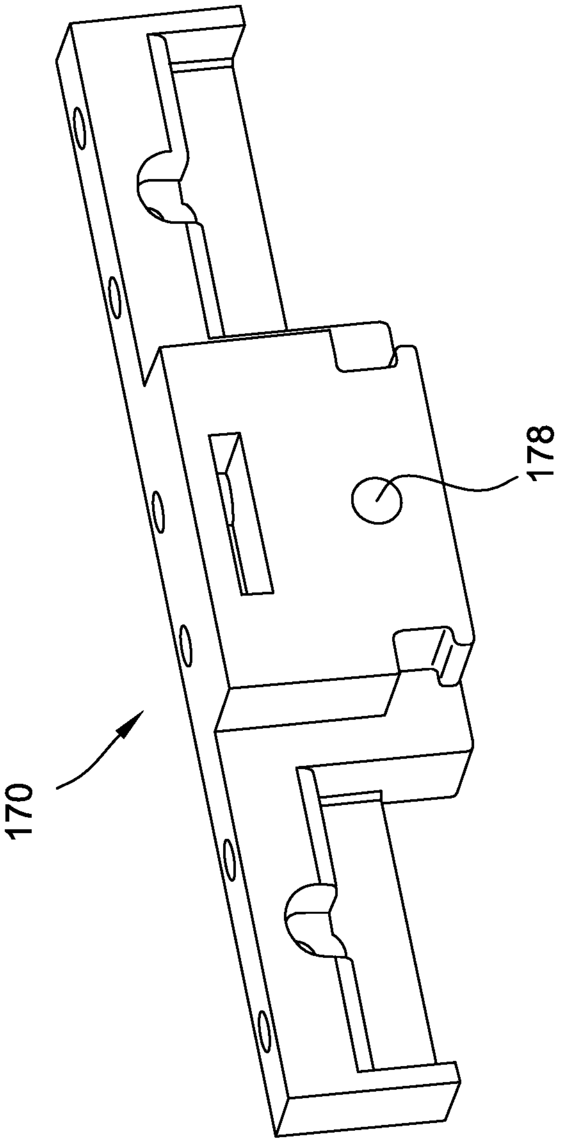
FIG. 9 is a front perspective view of a corner block of the door shown in FIG. 1.
Figure 10:
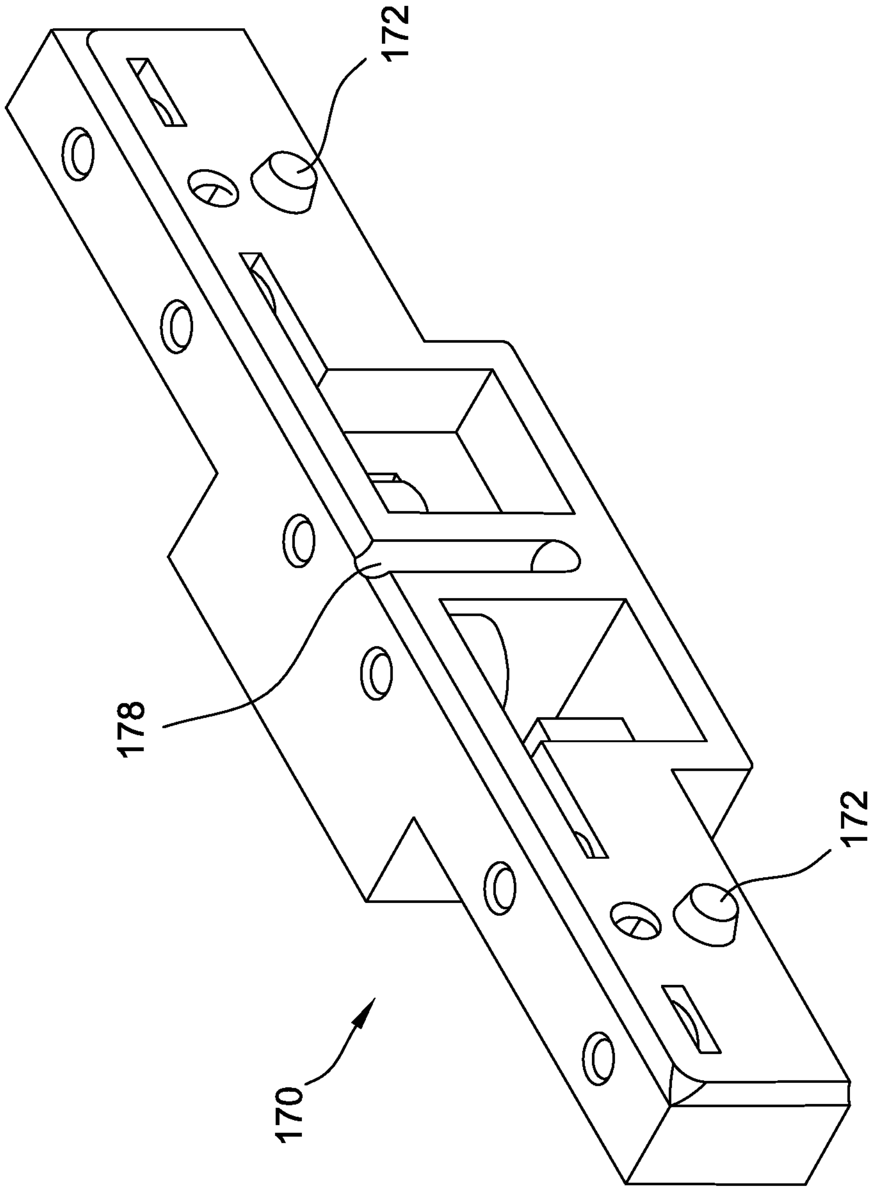
FIG. 10 is a back perspective view of the corner block shown in FIG. 9.
Figure 11A:
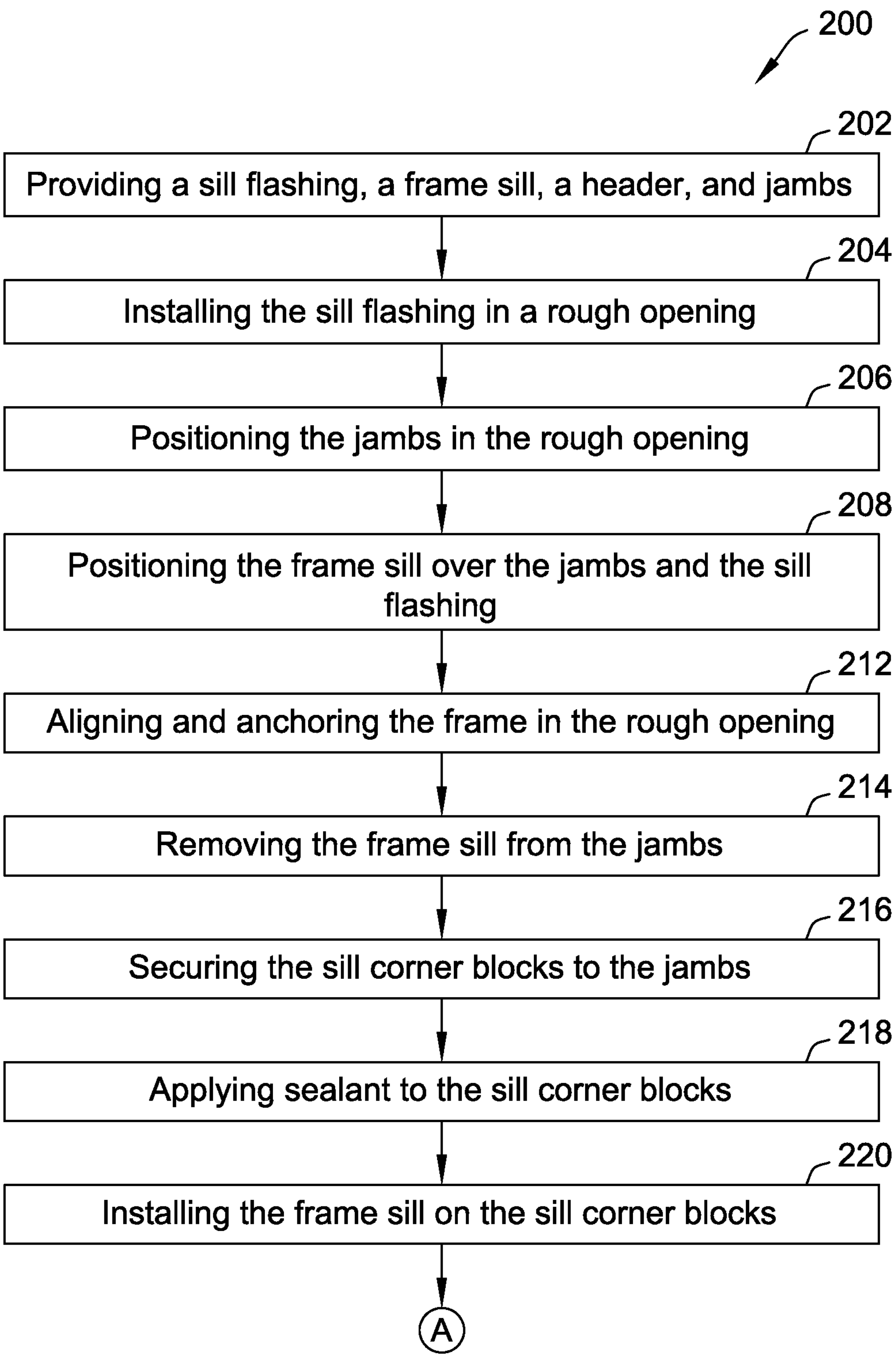
FIGS. 11A and 11B depict a flow chart of an example method of assembling the door shown in FIG. 1.
Figure 11B:
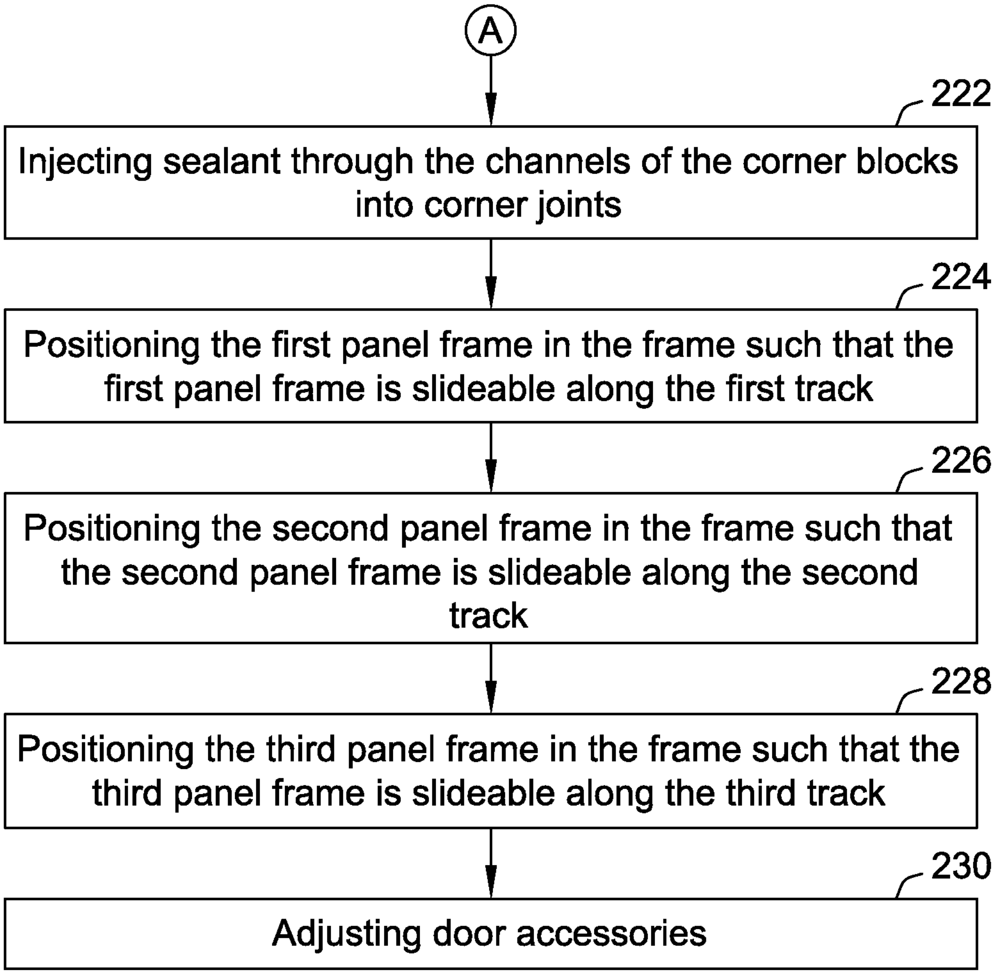

Referring to FIGS. 1-3, an example fenestration unit is indicated generally by 100. In the example, the fenestration unit is a door. In other embodiments, the fenestration unit may be a door, window, curtain wall, or any other fenestration unit. The door 100 includes a first glass unit 102, a second glass unit 104, a third glass unit 106, and a frame 108. The first glass unit 102 includes a first glass pane 110 and a second glass pane 112. The second glass pane 112 is spaced from the first glass pane 110 such that the first glass pane and the second glass pane define a pocket 114 therebetween. The second glass unit 104 includes a third glass pane 116 and a fourth glass pane 118. The fourth glass pane 118 is spaced from the third glass pane 116 such that the fourth glass pane and the third glass pane define a pocket 120 therebetween. The third glass unit 106 includes a fifth glass pane 122 and a sixth glass pane 124. The sixth glass pane 124 is spaced from the fifth glass pane 122 such that the fifth glass pane and the sixth glass pane define a pocket 126 therebetween. The pockets 114, 120, 126 may be filled with an insulating material such as argon gas. In other embodiments, the door 100 may include any glass units 102, 104, 106 that enable the door to function as described.

In addition, the door 100 includes a first panel frame 128 circumscribing the first glass unit 102, a second panel frame 130 circumscribing the second glass unit 104, and a third panel frame 132 circumscribing the third glass unit 106. The first panel frame 128, the second panel frame 130, and the third panel frame 132 each include a top rail 134, a bottom rail 136, and stiles 138. The rails 134, 136 extend horizontally and the stiles 138 extend vertically. The first glass unit 102 may be secured to the top rail 134, the bottom rail 136, and the stiles 138 of the first panel frame 128 by a glazing stop. The second glass unit 104 may be secured to the top rail 134, the bottom rail 136, and the stiles 138 of the second panel frame 130 by a glazing stop. The third glass unit 106 may be secured to the top rail 134, the bottom rail 136, and the stiles 138 of the third panel frame 132 by a glazing stop. In the example, the first glass unit 102 and the top rail 134, the bottom rail 136, and the stiles 138 of the first panel frame 128 may be connected to the frame 108 such that the first glass unit 102 and the first panel frame 128 are slidable or positionable relative to the frame 108. Also, the second glass unit 104 and the top rail 134, the bottom rail 136, and the stiles 138 of the second panel frame 130 may be connected to the frame 108 such that the second glass unit 104 and the second panel frame 130 are slidable or positionable relative to the frame 108. Accordingly, the door may be, for example and without limitation, a sliding door or a multi-slide door. In other embodiments, the glass units 102, 104, 106 and the panel frames 128, 130, 132 may be positioned in the frame 108 in any manner that enables the door 100 to operate as described. For example, in some embodiments, the door 100 includes three or more panels that are movable relative to the frame 108. In other embodiments, the first panel frame 128 or the second panel frame 130 may be fixed relative to the frame 108.

The door 100 may include hardware such as a handle 140 to enable the glass units 102, 104, 106 and the panel frames 128, 130, 132 to be positionable relative to the frame 108. In some embodiments, the door 100 may include rollers and locks.

The frame 108 includes a frame sill 152, a header 146, and jambs 148. In some embodiments, the door 100 may include cladding attached to the frame 108 and/or the panels. In the example, the frame sill 152 and the header 146 extend horizontally and define a width of the door 100. The jambs 148 extend vertically and define a height of the door 100. Together the frame sill 152, the header 146 and the jambs 148 are configured to circumscribe and support the first glass pane 110, the second glass pane 112, the third glass pane 116, the fourth glass pane 118, the fifth glass pane 122, and the sixth glass pane 124. In the illustrated embodiment, the frame 108 is rectangular. In other embodiments, the door 100 may include any frame 108 that enables the door to function as described.

In reference to FIGS. 2-6, a sill system 144 includes a sill flashing 150 and the frame sill 152. The frame sill 152 is positioned on the sill flashing 150. The frame sill 152 includes a first track 154, a second track 156, and a third track 158. The first panel frame 128 and the first glass unit 102 are slidable along the first track 154 when positioned in the frame 108. The second panel frame 130 and the second glass unit 104 are slidable along the second track 156 when positioned in the frame 108. The third panel frame 132 and the third glass unit 106 are slidable along the third track 158 when positioned in the frame 108. Accordingly, the door 100 is a multi-slide door. In some embodiments, the door 100 may include two or more slidable panels and the frame sill 152 may define two or more tracks 154, 156, 158. In some embodiments, two or more panels may be slidable along the same track and the door 100 may have, for example, a bi-parting arrangement (shown in FIG. 12).

In the example, the sill flashing 150 includes two pieces (e.g., a left piece and a right piece) arranged and shaped to inhibit moisture intrusion through the door 100. Each piece includes an end wall that interfaces with the respective jamb 148. In other embodiments, the sill flashing 150 may be a single piece or include more than two pieces. The sill flashing 150 includes a base 160 extending under the tracks 154, 156, 158 and at least one wall 162 extending upward from the base. The sill flashing 150 is arranged to interface with a floor and attach to the floor or sub-floor material. Suitably, the sill flashing 150 is sized and shaped to fit into notches on the lower ends of the jambs 148. The frame sill 152 is shaped and arranged to abut the jambs 148 when positioned on the sill flashing 150. The sill system 144 is arranged such that the frame sill 152 is removable from the frame 108 without disassembling the sill flashing 150, the jambs 148, and the header 146.

The frame sill 152 includes a first wall 164, a second wall 166, and a top 168. The walls 164, 166 extend downward from opposite sides of the top 168 and along the length of the tracks 154, 156, 158. The top 168 extends between the walls 164, 166 and the tracks 154, 156, 158. Specifically, the top 168 includes a first section that extends between the first wall 164 and the first track 154, a second section that extends between the first track 154 and the second track 156, and a third section that extends between the second track 156 and the third track 158. In some embodiments, the frame sill 152 may include a fourth track between the third track 158 and the second wall 166, such as a track for a slidable screen unit or for another panel. The top 168 may include additional sections that extend between additional track(s), the third track 158, and/or the second wall 166. The top 168 is substantially parallel to the base 160 of the sill flashing 150 when the frame sill 152 is on the sill flashing.

In some embodiments, the sill system 144 includes features such as moisture cavities and weep holes to inhibit moisture intrusion through the door 100 and allow drainage of fluid from the sill system. For example, the frame sill 152 may include one or more weep holes positioned in fluid communication with each track 154, 156, 158 to allow moisture in the tracks to drain to the exterior of the door 100. In some embodiments, the sill system 144 may include plugs or diverters in the weep holes.

The frame sill 152 is sized to cover the base 160 and the wall 162 of the sill flashing 150. For example, the top 168 and the tracks 154, 156, 158 are sized and shaped to cover the base 160. Also, the first wall 164, the top 168, and the first track 154 define a cavity shaped to receive the wall 162 of the sill flashing 150 when the frame sill 152 is attached to the sill flashing 150. Accordingly, the sill flashing 150 is entirely concealed when the frame sill 152 is positioned on the sill flashing 150 and the door 100 is installed in a wall. Suitably, the frame sill 152 has a width that is larger than a width of the sill flashing 150. In addition, the frame sill 152 has a height that is larger than a height of the sill flashing 150. Also, the frame sill 152 has a length that is approximately equal to a length of the sill flashing 150 or equal to a length of the exposed portion of the sill flashing 150 between the jambs 148. In some embodiments, the sill flashing 150 extends at least partly underneath the jambs 148 and/or is attached to the jambs.

The frame sill 152 may be removed from the frame 108 without disassembling the sill flashing 150, the jambs 148, and the header 146. For example, the frame sill 152 and/or the sill flashing 150 may be attached to the floor, floor materials, and/or the jambs 148 by screw or fastener connection assemblies. In the example, the sill flashing 150 is attached to the floor or subfloor material and the frame sill 152 is removably attached to the sill flashing 150. The frame sill 152 may be removed from the sill flashing 150 by removing the attachment means. The frame 108 may maintain its shape and structural integrity without the frame sill 152 because the frame sill 152 is not structurally attached to the jambs 148. As a result, the sill system 144 may be easily removed, repaired, and/or replaced if, for example, the tracks 154, 156, 158 of the frame sill 152 need to be replaced.

Also, in the example, the header 146, the jambs 148, and the frame sill 152 are single pieces. For example, the header 146, the jambs 148, and the frame sill 152 may each be extruded as single pieces. Accordingly, the header 146, the jambs 148, and the frame sill 152 each may be free from any seams or joints. As a result, the frame 108 may have an increased strength and may be less prone to moisture intrusion than prior art systems. Moreover, the frame 108 may take less time to install than at least some systems.

In particular, in the example, the frame sill 152 is a seamless, single piece and includes the tracks 154, 156, 158. In contrast, conventional multi-slide doors include separate pieces for the tracks and the track pieces are joined together at seams. In the example door 100, the seamless, single piece frame sill 152 inhibits moisture intrusion through the door, decreases the time required to install the door, and reduces the cost of the door in comparison to doors that include multiple track pieces.

In reference to FIGS. 7-10, in addition, the frame 108 may include corner blocks 170, 180 and pegs 172, 182 that are arranged to align and connect the header 146, the sill system 144, and the jambs 148 at corner joints 174. For example, the pegs 172, 182 are sized and shaped to extend into openings 176 at the corner joints 174 of the frame 108. The corner blocks 170 define channels 178 for injection of a sealant into the corner joints 174. The channels 178 extend through the corner blocks 170 from the front to the back of the corner block at approximately the midpoint of the corner block. At the back of the corner block 170, the channel 178 extends upward to an upper edge and along the upper edge of the corner block 170. The channel 178 has an open fillet radius on the back of the corner block 170 to allow the sealant to flow into the corner joint 174 from the channel and seal the corner joint. The corner blocks 170 may be any suitable shape.

In some embodiments, the corner blocks 170, the sill corner blocks 180, the pegs 172, the sill pegs 182, and/or the openings 176 may be integrated into the sill system 144, the header 146, and/or the jambs 148. In the example, the corner blocks 170 and the sill corner blocks 180 are separate pieces from the sill system 144, the header 146, and the jambs 148. The corner blocks 170 are sized and shaped to engage the ends of the header 146. The corner blocks 170 include the pegs 172 arranged to align and connect the header 146 and the jambs 148. The jambs 148 include openings 176 sized and arranged to receive the pegs 172. The pegs 172 extend into the openings 176 of the jamb 148 to align the header 146 and the jambs 148 at the corner joints 174.

In addition, the sill system 144 may include sill corner blocks 180 and pegs 182 arranged to align and connect the sill system 144 and the jambs 148. For example, the pegs 182 are positioned on the sill corner blocks 180 and are sized and shaped to extend into openings in the frame sill 152. The corner blocks 180 are sized and shaped to engage the jambs 148 and the sill flashing 150. The corner blocks 180 may include one or more surfaces or channels to apply sealant on the frame 108.

Also, the door 100 may include screw or fastener connection assemblies to connect the sill system 144, the header 146, and the jambs 148 together. The corner blocks 170, 180 and the pegs 172, 182 are shaped to connect the sill system 144, the header 146, and/or the jambs 148 in conjunction with the screw connection assemblies such that the sill, the header and the jambs extend at angles relative to each other. For example, in the illustrated embodiment, each corner joint 174 defines a right angle. In other embodiments, the frame 108 may include any corner blocks 170, 180, pegs 172, 182, and/or openings 176 that enable the door 100 to function as described.

In reference to FIG. 3-6, in this embodiment, weatherstripping 184 may be positioned along the door opening. In some embodiments, the weatherstripping 184 may include an inner strip and an outer strip extending along the opening on opposite sides of the door 100 and/or between slidable panels of the door. Accordingly, the weatherstripping 184 may inhibit moisture and/or wind penetrating around the door and flowing to the interior when the door 100 is in a closed position. In addition, the weatherstripping 184 may dampen the transmission of sound waves through the door 100.

The frame 108 may include one or more thermal seals. For example, the thermal seals may be connected to the frame 108, the first glass unit 102, the second glass unit 104, the third glass unit 106, the top rail 134, the bottom rail 136, and the stiles 138. The thermal seals may extend through cavity of the frame 108 and inhibit thermal transfer through the cavity. In other embodiments, the frame 108 may include any seals that enable the frame 108 to function as described.

The frame 108 may include any suitable materials. For example, the sill system 144, the header 146, and/or the jambs 148 may include any material such as, for example and without limitation, metal, wood, vinyl, and fiberglass.

The frame 108 further defines at least one frame thermal break 188. In addition, the top rail 134, the bottom rail 136, and the stiles 138 define a panel thermal break 190. An insulating material having a thermal conductance less than other materials of the door 100 may be positioned within the frame thermal break 188 and the panel thermal break 190. For example, the insulating material may have a thermal conductance in a range of about 0.21 British thermal units per hour square feet degrees Fahrenheit (Btu/(hr·ft$^{2}$·° F.)) to about 0.840 Btu/(hr·ft$^{2}$·° F.). The insulating material substantially fills the frame thermal break 188 and the panel thermal breaks 190 and extends between portions of the frame 108 to reduce heat transfer through the door. In other embodiments, the door 100 may include any insulating material that enables the door to operate as described.

In reference to FIGS. 1-11B, a method 200 of assembling the door 100 includes providing 202 components for the frame 108. For example, the sill flashing 150, the frame sill 152, the header 146, and the jambs 148 may be cut for the frame 108 from a material such as aluminum, wood, or vinyl. The components may be shipped to an installation site and assembled at the installation site. In other embodiments, the frame 108 may be fabricated in any manner that enables the frame to function as described.

The frame 108 may be assembled by installing 204 the sill flashing 150 in a rough opening. The sill flashing 150 may be placed in a bed of sealant in the rough opening and positioned such that the sill flashing is level from end to end. Anchors may be secured to the sill flashing 150 at appropriate spacings (e.g., at locations 4 in. from each end and at the center of the sill flashing 150).

The jambs 148 are positioned 206 in the rough opening and aligned relative to the sill flashing 150. For example, notches in the jambs 148 may be positioned over the end walls of the sill flashing 150. The jambs 148 may be anchored at the centers and/or anywhere along the length of the jambs. In some embodiments, covers may be removed from the jambs 148. In some embodiments, the header 146 may be attached to the jambs 148 before the jambs 148 are positioned in the rough opening. The header 146 may be attached to the jambs at corner joints using corner blocks 170, fasteners secured into splines or bosses on the jambs and/or header, and/or corner keys. In other embodiments, the header 146 is not attached to the jambs 148 and is positioned in the rough opening before or after the frame sill 152.

In addition, the method 200 includes positioning 208 the frame sill 152 over the jambs 148 and the sill flashing 150. In some embodiments, the header 146 is set onto the jambs 148 and anchors are inserted through the corner blocks 170 after the jambs 148 are positioned in the rough openings. In some embodiments, the pegs 172 are inserted into the openings 176 to connect the headers 146 and the jambs 148 and form the corner joints 174 of the frame. The frame 108 is then aligned 212 (i.e., squared) in the rough opening and anchored in position. Jamb covers may be secured on the jambs 148 if necessary.

The frame sill 152 is removed 214 from the jambs 148 and the sill corner blocks 180 are secured 216 to the jambs 148. Sealant is applied 218 to the sill corner blocks 180 and the frame sill 152 is installed 220 on the sill corner blocks 180. For example, the frame sill 152 may be positioned on the sill corner blocks 180 and over the sill flashing 150 such that the sill flashing 150 is not visible from the exterior of the door 100. In some embodiments, the sill flashing 150 is partially visible from the exterior of the door 100 and the sill flashing 150 includes a finished surface to provide an improved aesthetic appearance. The sill system 144 may interface with a floor of the structure. The sill flashing 150 and the frame sill 152 interface with the floor to provide an improved aesthetic appearance and to prevent moisture intrusion through the door. For example, the sill flashing 150 may be secured to the floor or sub-floor material. The frame sill 152 is secured over the sill flashing 150 and may be flush with the floor to provide a smooth transition. The frame sill 152 may be positioned on the sill flashing 150 such that the frame sill 152 is removable from the frame without disassembling the sill flashing 150, the header 146, and the jambs 148. Accordingly, the sill system 144 may simplify repair of the door 100 and/or the floor. The sill system 144 may be secured using nails or other fastening mechanisms and/or adhesives. In some embodiments, anchors 192 (shown in FIG. 2) and fillers 194 (shown in FIG. 2) may be used to install the sill system 144. For example, the anchors 192 may be positioned between the sill flashing 150 and the frame sill 152 to secure the frame sill 152 in position.

The frame 108 may be sealed by injecting 222 sealant through the channels 178 of the corner blocks 170 into the corner joints 174. In some embodiments, the header 146, the sill system 144, and/or the jambs 148 are connected using fasteners in addition to or in place of the pegs 172, 182 and corner blocks 170, 180.

After the frame 108 is assembled, the glass units 102, 104, 106 may be positioned in the frame 108. To assemble doors 100 that are operable (i.e., positionable between opened and closed positions), the glass units 102, 104, 106 may be supported by the panel frames 128, 130, 132 that are moveably positioned in the frame 108. The first panel frame 128 is positioned 224 in the frame 108 such that the first panel frame is slidable along the first track 154. The second panel frame 130 is positioned 226 in the frame 108 such that the second panel frame is slidable along the second track 156. The third panel frame 132 is positioned 228 in the frame 108 such that the third panel frame is slidable along the third track 158. The panel frames 128, 130, 132 may be positioned such that the panel frames are movable, e.g., pivotable and/or slidable, relative to the frame 108. The panels are positioned in the frame 108 at the installation site. In some embodiments, some of the glass panes of the door 100 may be fixed. For the fixed glass panes, the panel frame 128, 130, 132 may be positioned and secured such that the position of the glass pane is fixed relative to the frame 108. Accessories for the door 100 such as rollers and lock bars may be adjusted 230 to ensure proper operation of the door.

The corners of the frame 108 may be sealed, for example, by at least partially filling the openings with sealant which may be injected through the corner blocks 170, 180. In addition, any seams in the corners may be sealed. Alternatively or in addition, molded gaskets may be used to seal the frame 108. After sealing, the frame 108 may be prepared for hardware attachment.

In other embodiments, the frame 108 may be assembled in any suitable manner using, for example and without limitation, adhesives, fasteners, and/or any other suitable attachment means.

The steps of the method illustrated and described herein are in a specific order that provides advantages for the described embodiments. In other embodiments, the method may be performed in any order and the embodiments may include additional or fewer operations than those described herein. For example, it is contemplated that executing or performing a particular operation before, contemporaneously with, or after another operation is within the scope of some aspects of the description.

Figure 12:
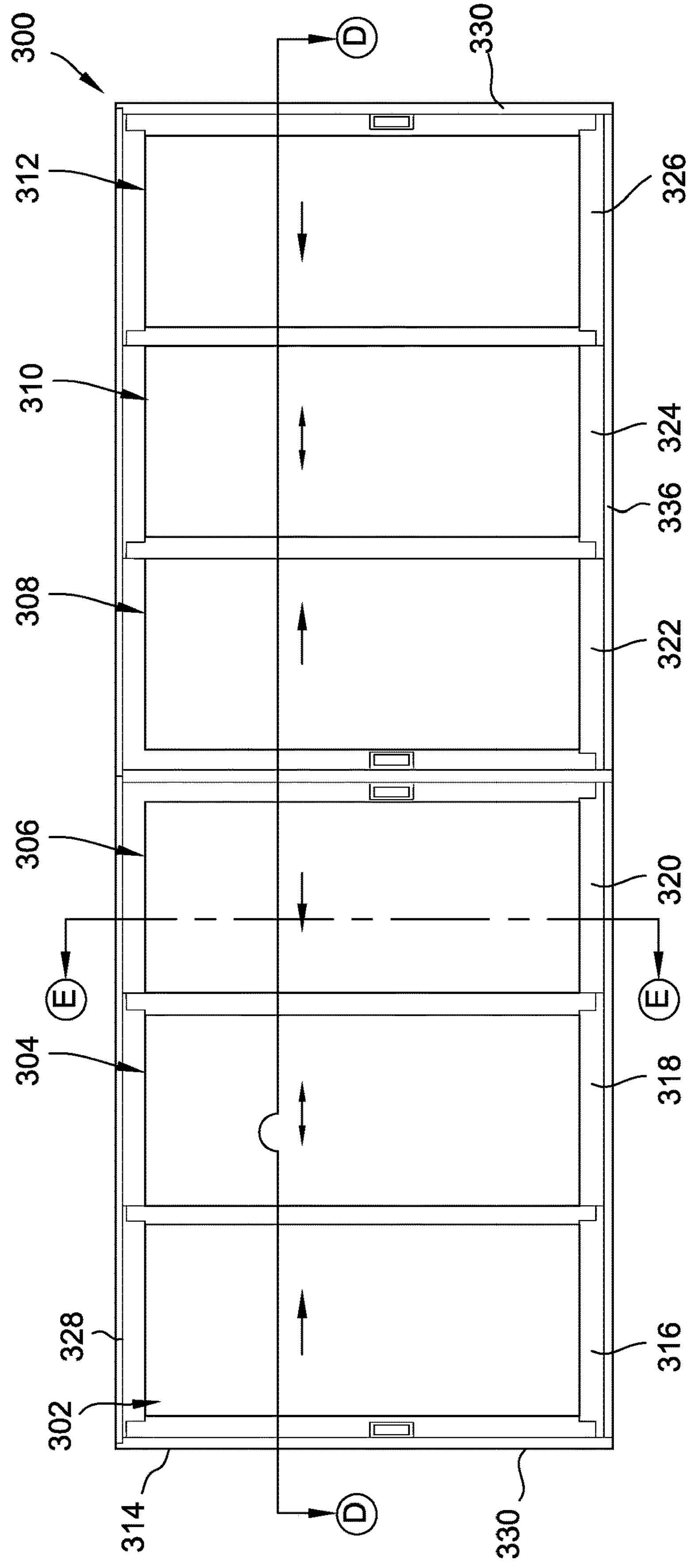
FIG. 12 is an elevation view of an example door including multiple sliding panels with a bi-parting arrangement.
Figure 13:
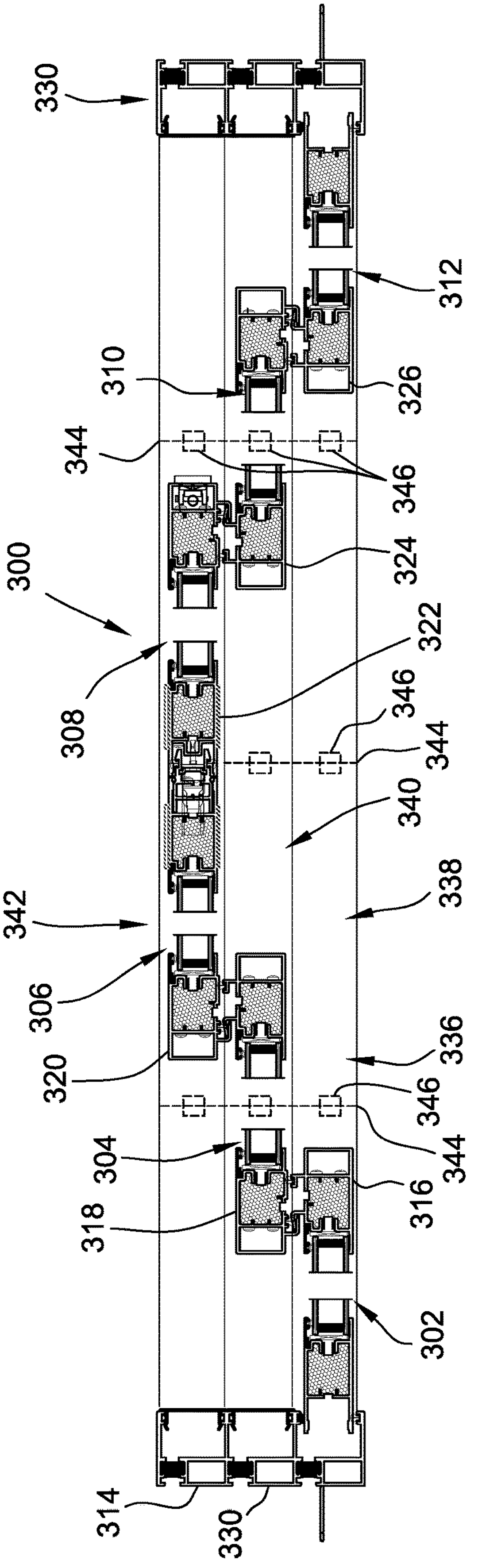
FIG. 13 is a sectional view of the door shown in FIG. 12, taken along section line D-D.
Figure 14:
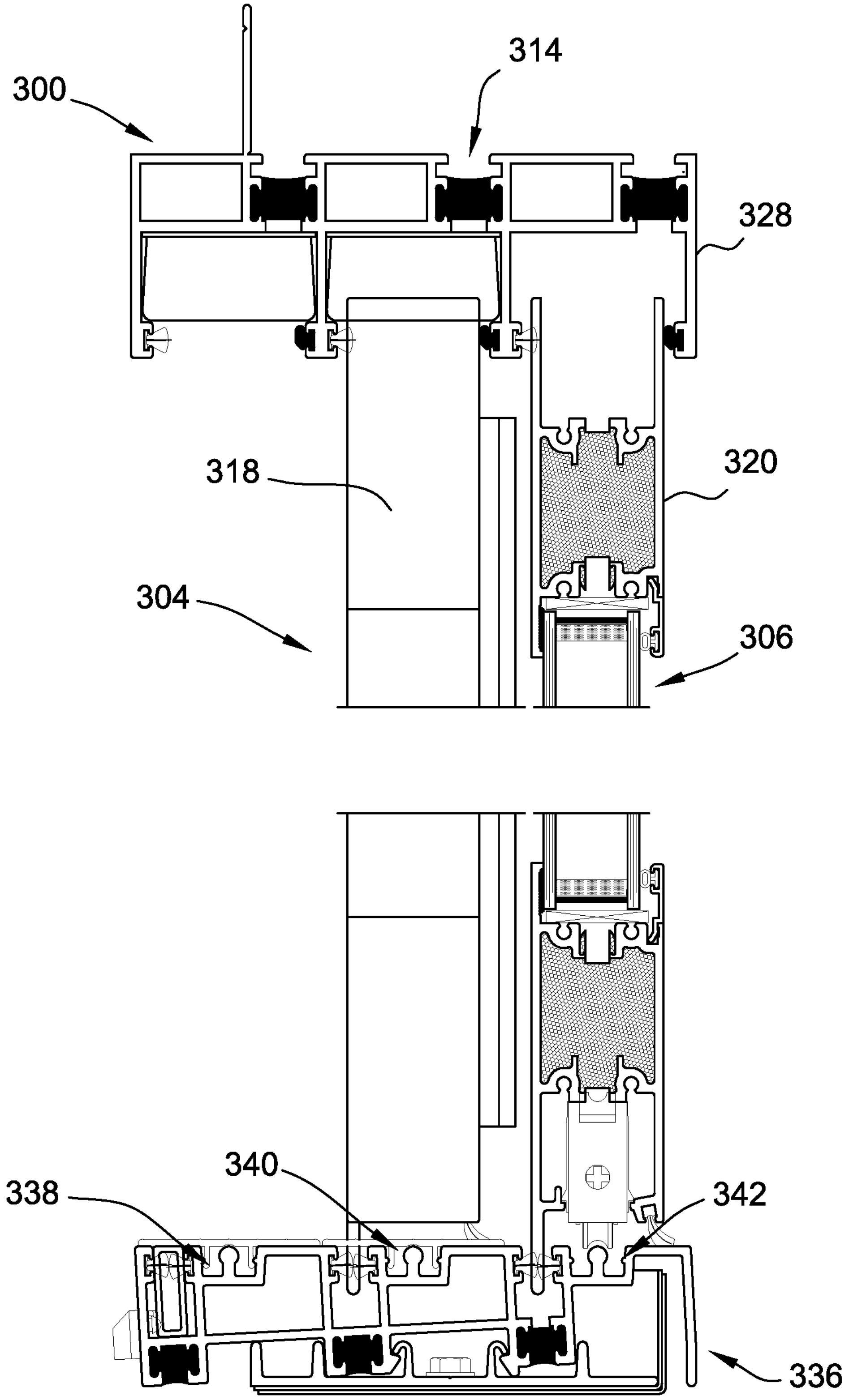
FIG. 14 is a sectional foreshortened view of the door shown in FIG. 12, taken along section line E-E.

In reference to FIGS. 12-14, a door 300 includes a first glass unit 302, a second glass unit 304, a third glass unit 306, a fourth glass unit 308, a fifth glass unit 310, a sixth glass unit 312, and a frame 314. The glass units 302, 304, 306, 308, 310, 312 define pockets that may be filled with a gas such as argon to reduce the transfer of heat through the door 300. In other embodiments, the door 300 may include any glass unit that enables the door to function as described.

In addition, the door 300 includes a first panel frame 316, a second panel frame 318, a third panel frame 320, a fourth panel frame 322, a fifth panel frame 324, and a sixth panel frame 326. The first panel frame 316 circumscribes the first glass unit 302. The second panel frame 318 circumscribes the second glass unit 304. The third panel frame 320 circumscribes the third glass unit 306. The fourth panel frame 322 circumscribes the fourth glass unit 308. The fifth panel frame 324 circumscribes the fifth glass unit 310. The sixth panel frame 326 circumscribes the sixth glass unit 312. In this embodiment, the first panel frame 316, the second panel frame 318, the third panel frame 320, the fourth panel frame 322, the fifth panel frame 324, and the sixth panel frame 326 are configured to slide relative to the frame 314. As shown and described, the door 300 of this embodiment is a sliding door, but in other embodiments, the door 300 may have any number of panels, and other configurations, that enable the door 300 to function as described.

The frame 314 includes a header 328, jambs 330, and a frame sill 336. The frame sill 336 defines a first track 338, a second track 340, and a third track 342 and includes at least one seamless piece that spans a width of the first, second, and third tracks. In some embodiments, the frame sill 336 does not define a third track 342. The first glass unit 302 and the first panel frame 316 and the fourth glass unit 308 and the fourth panel frame 322 are slidable along the first track 338 when positioned in the frame 314. The second glass unit 304 and the second panel frame 318 and the fifth glass unit 310 and the fifth panel frame 324 are slidable along the second track 340 when positioned in the frame 314. The third glass unit 306 and the third panel frame 320 and the sixth glass unit 312 and the sixth panel frame 326 are slidable along the third track 342 when positioned in the frame 314. Accordingly, the door 300 is a multi-slide door with a bi-parting arrangement.

In some embodiments, the frame 314 includes one or more joints 344 disposed along the length of frame 314 and extending transverse to the longitudinal axis of the door 300. For example, multiple pieces may be spliced together at the joints 344 to form the header 328 and/or the frame sill 336 of the frame 314. The joints 344 facilitate the door 300 having a longer span and/or including additional panels. The frame 314 may include splice blocks 346 disposed at the joints 344 to receive the pieces of the frame sill 336 and facilitate removal of the frame sill 336. The pieces of the frame sill 336 may be removably secured on the splice blocks 346 in an end to end arrangement. Each piece of the frame sill 336 is seamless and spans the width of the tracks 338, 340, 342.

Figure 15:
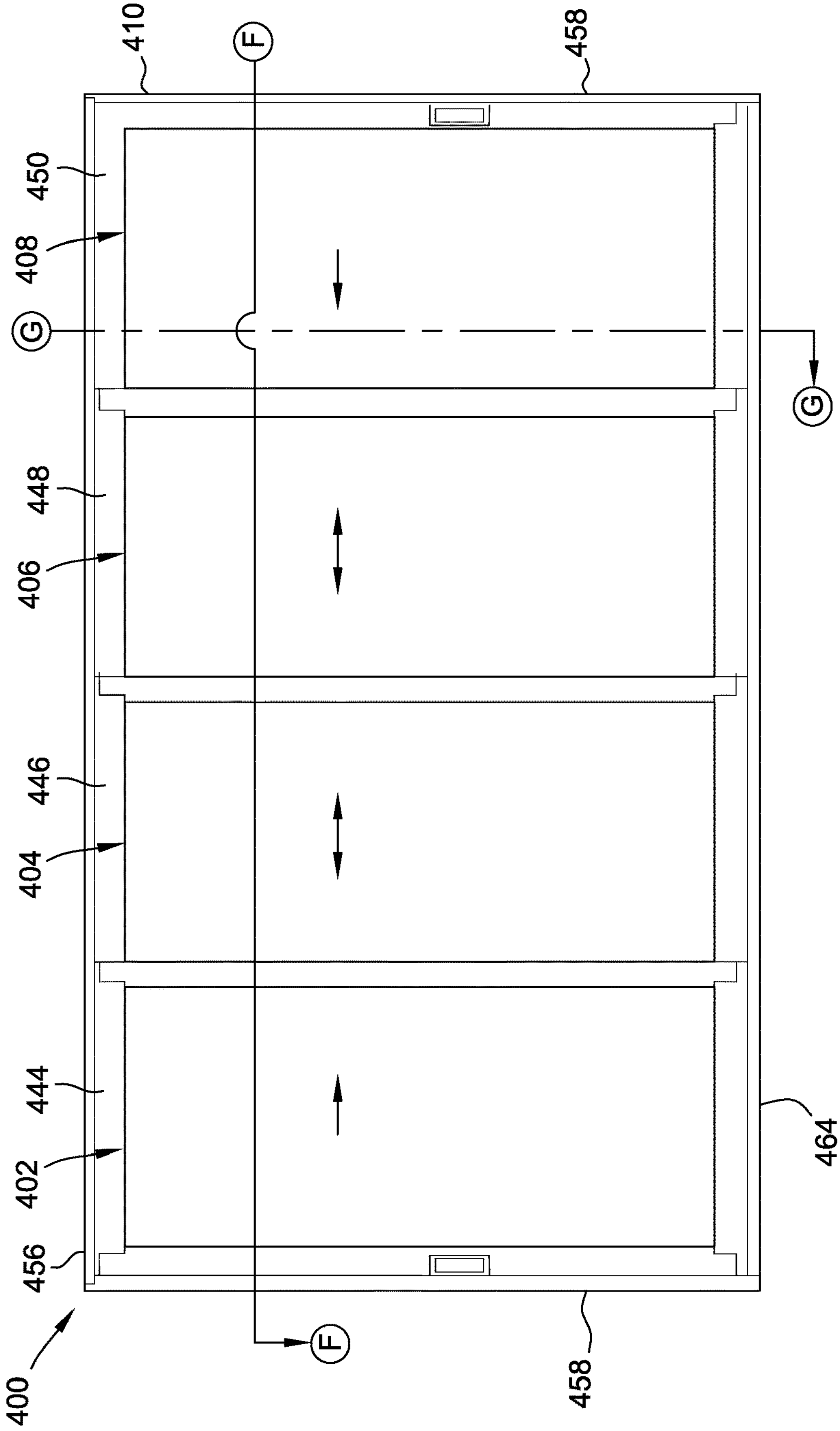
FIG. 15 is an elevation view of an example door including multiple sliding panels.
Figure 16:
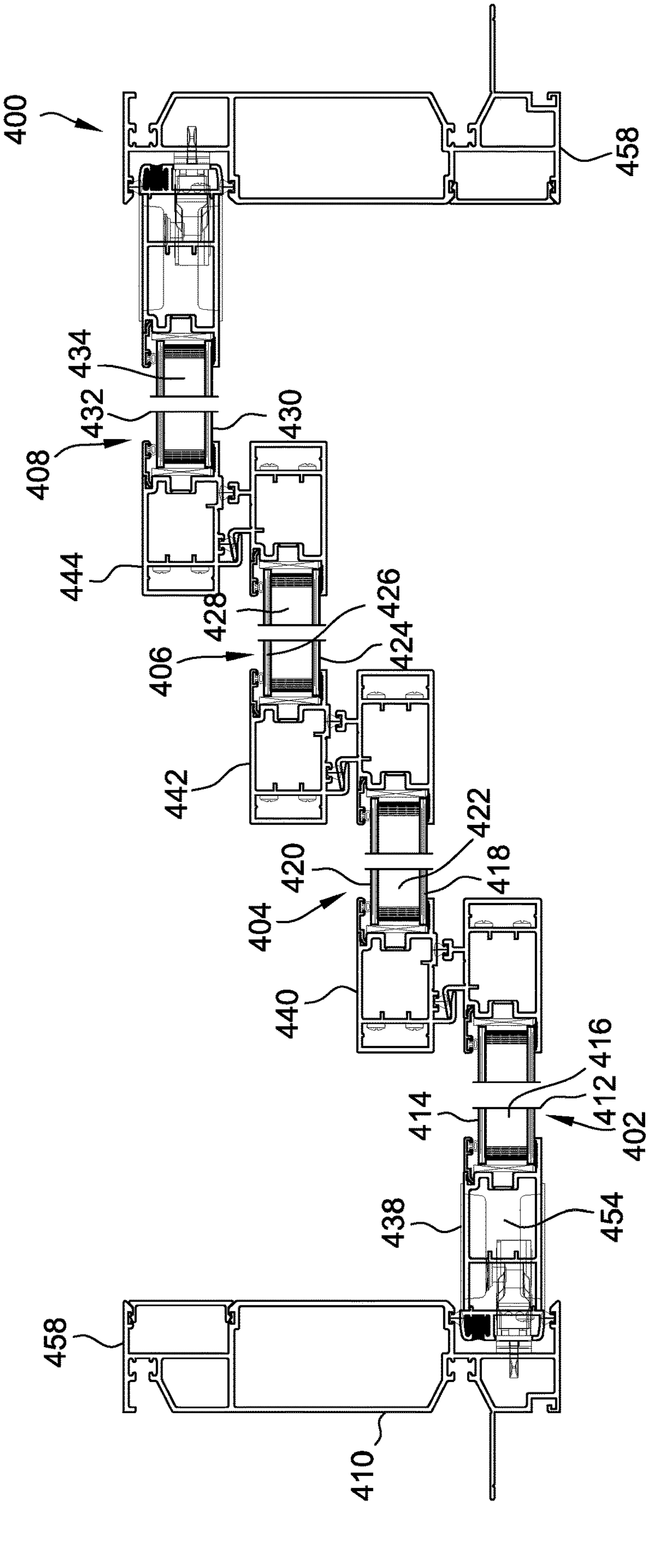
FIG. 16 is a sectional foreshortened view of the door shown in FIG. 15, taken along section line F-F.
Figure 17:
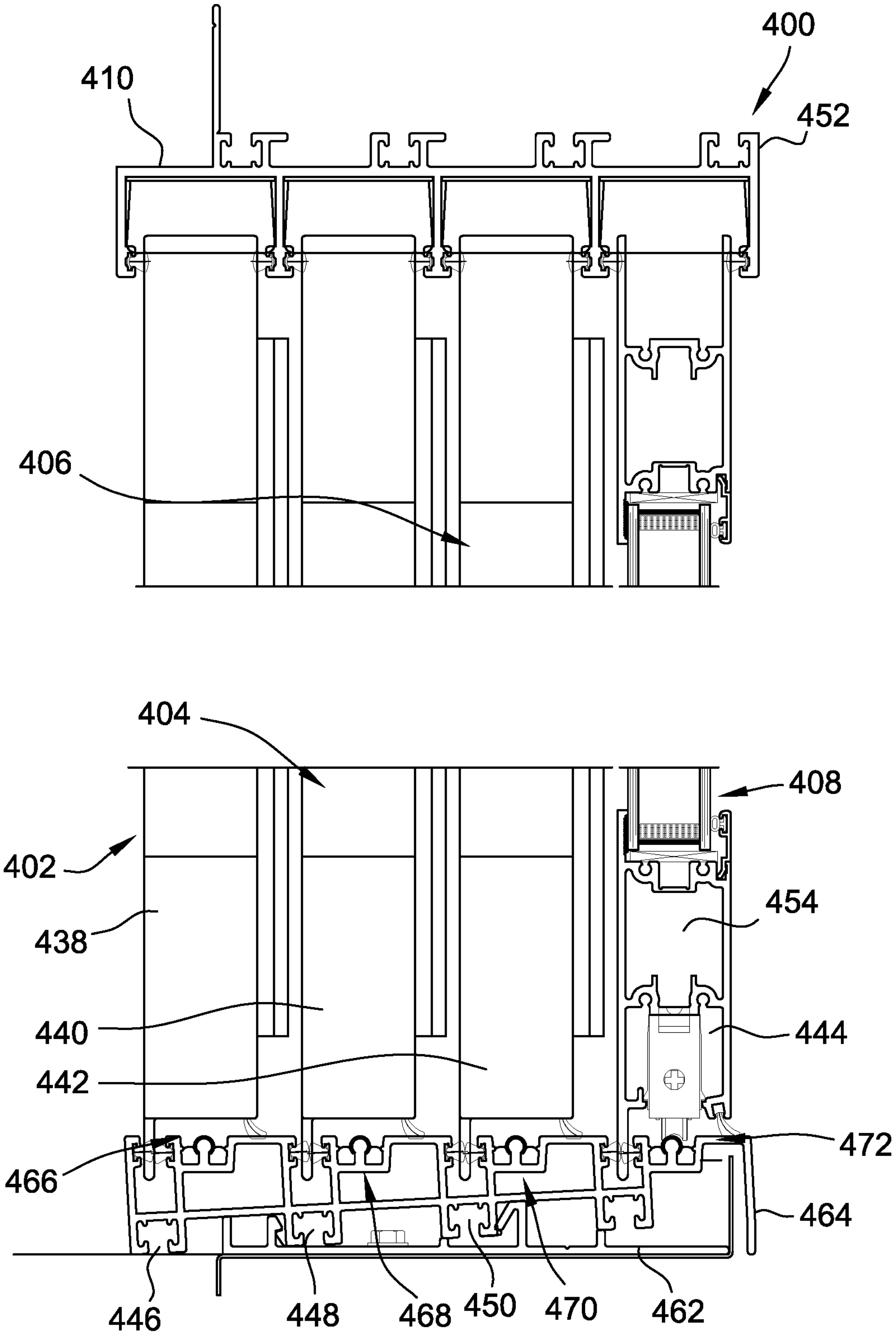
FIG. 17 is a sectional foreshortened view of the door shown in FIG. 15, taken along section line G-G.

In reference to FIGS. 15-17, a door 400 includes a first glass unit 402, a second glass unit 404, a third glass unit 406, a fourth glass unit 408, and a frame 410. The first glass unit 402 includes a first glass pane 412 and a second glass pane 414. The second glass pane 414 is spaced from the first glass pane 412 such that the first glass pane and the second glass pane define a pocket 416 therebetween. The second glass unit 404 includes a third glass pane 418 and a fourth glass pane 420. The fourth glass pane 420 is spaced from the third glass pane 418 such that the third glass pane and the fourth glass pane define a pocket 422 therebetween. The third glass unit 406 includes a fifth glass pane 424 and a sixth glass pane 426. The sixth glass pane 426 is spaced from the fifth glass pane 424 such that the fifth glass pane and the sixth glass pane define a pocket 428 therebetween. The fourth glass unit 408 includes a seventh glass pane 430 and an eighth glass pane 432. The eighth glass pane 432 is spaced from the seventh glass pane 430 such that the seventh glass pane and the eighth glass pane define a pocket 434 therebetween. The pockets 416, 422, 428, 434 may be filled with a gas such as argon to reduce the transfer of heat through the door 400. In other embodiments, the door 400 may include any glass unit that enables the door to function as described.

In addition, the door 400 includes a first panel frame 438, a second panel frame 440, a third panel frame 442, and a fourth panel frame 444. The first panel frame 438 circumscribes the first glass unit 402. The second panel frame 440 circumscribes the second glass unit 404. The third panel frame 442 circumscribes the third glass unit 406. The fourth panel frame 444 circumscribes the fourth glass unit 408. In this embodiment, the first panel frame 438, the second panel frame 440, the third panel frame 442, and the fourth panel frame 444 are configured to slide relative to the frame 410. As shown and described, the door 400 of this embodiment is a sliding door, but in other embodiments, the door 400 may have any number of panels, and other configurations, that enable the door 300 to function as described.

The door 400 includes at least one thermal break extending between first and second sides of the frame and generally circumscribing the first glass unit 402, the second glass unit 404, the third glass unit 406, and the fourth glass unit 408. Specifically, the frame 410 includes a first frame thermal break 446, a second frame thermal break 448, a third frame thermal break 450, and a fourth frame thermal break 452. The first panel frame 438, the second panel frame 440, the third panel frame 442, and the fourth panel frame 444 each include a panel thermal break 454.

The frame 410 includes a header 456, jambs 458, and a frame sill 464. The frame sill 464 is positioned on a sill flashing 462 such that the frame sill entirely covers the sill flashing. The frame sill 464 defines a first track 466, a second track 468, a third track 470, and a fourth track 472 and includes a seamless piece that spans a width of the first, second, third, and fourth tracks. The first glass unit 402 and the first panel frame 438 are slidable along the first track 466 when positioned in the frame 410. The second glass unit 404 and the second panel frame 440 are slidable along the second track 468 when positioned in the frame 410. The third glass unit 406 and the third panel frame 442 are slidable along the third track 470 when positioned in the frame 410. The fourth glass unit 408 and the fourth panel frame 444 are slidable along the fourth track 472 when positioned in the frame 410. The first frame thermal break 446, the second frame thermal break 448, the third frame thermal break 450, the fourth frame thermal break 452, and/or the panel thermal breaks 454 may be aligned with the first track 466, the second track 468, the third track 470, and the fourth track 472 such that the door 400 includes one or more continuous thermal breaks. In addition, the sill flashing 462 extends under the first track 466, the second track 468, the third track 470, and the fourth track 472.

Figure 18:
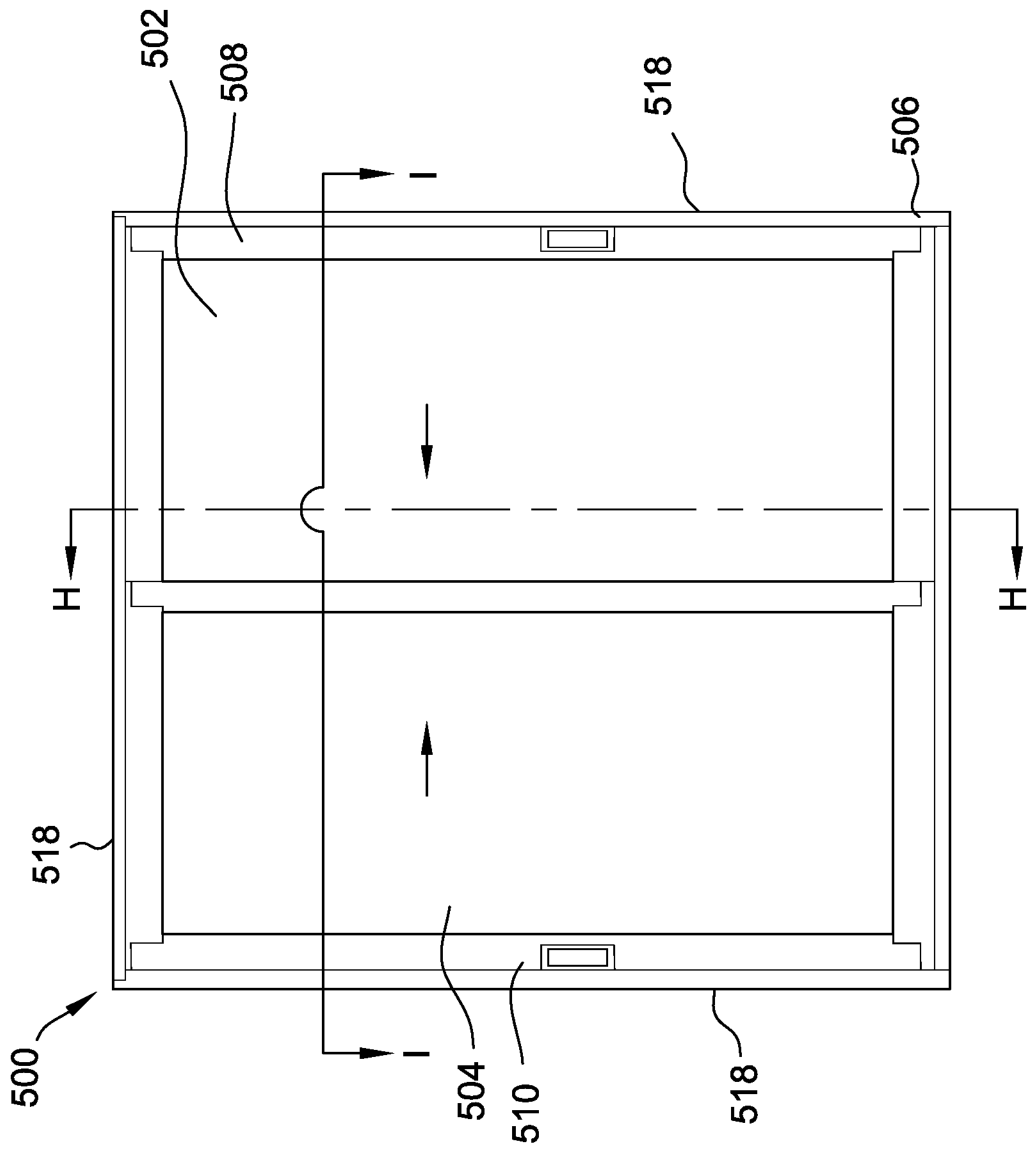
FIG. 18 is an elevation view of an example door including multiple sliding panels.
Figure 19:
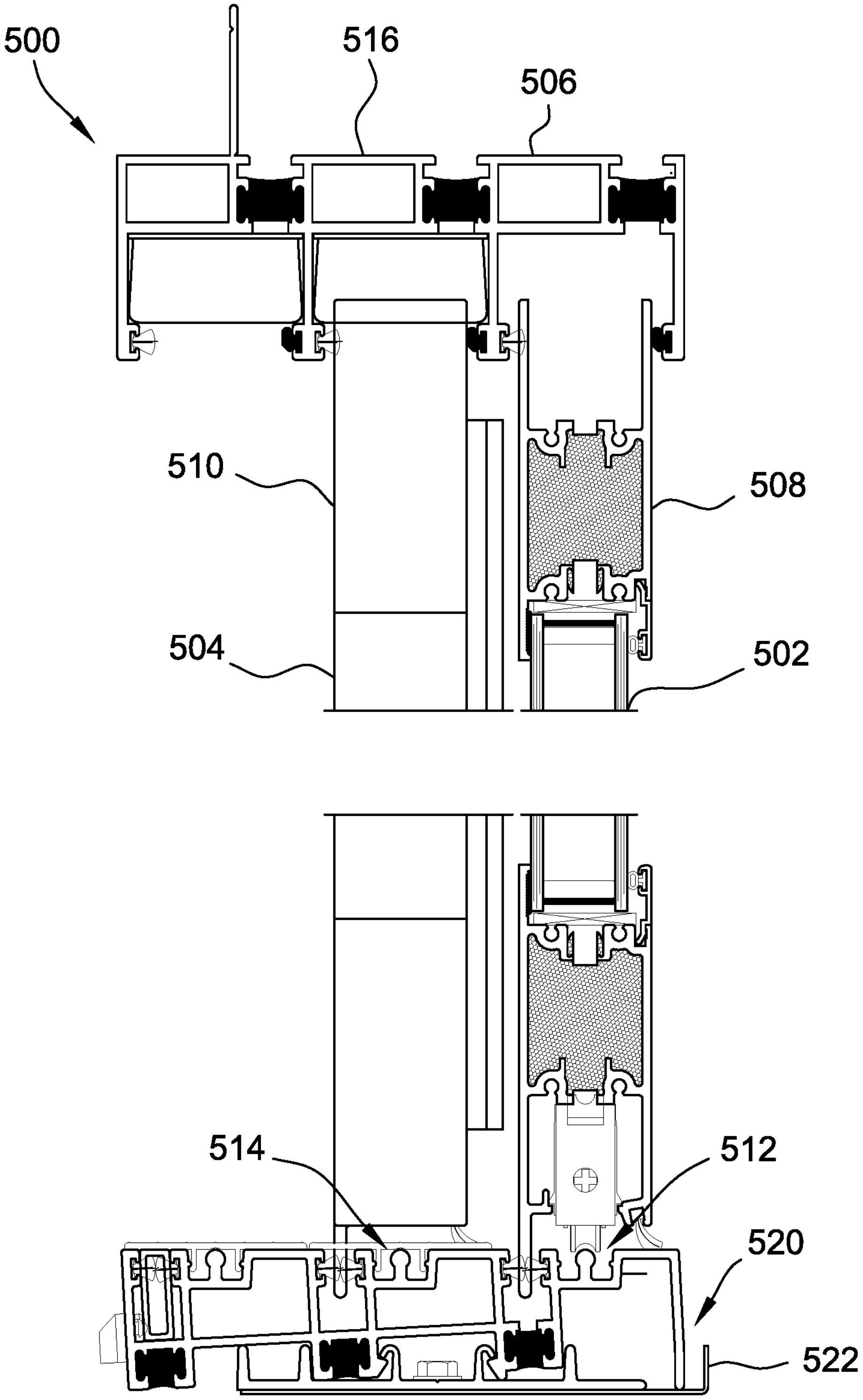
FIG. 19 is a sectional foreshortened view of the door shown in FIG. 18, taken along section line H-H.
Figure 20:
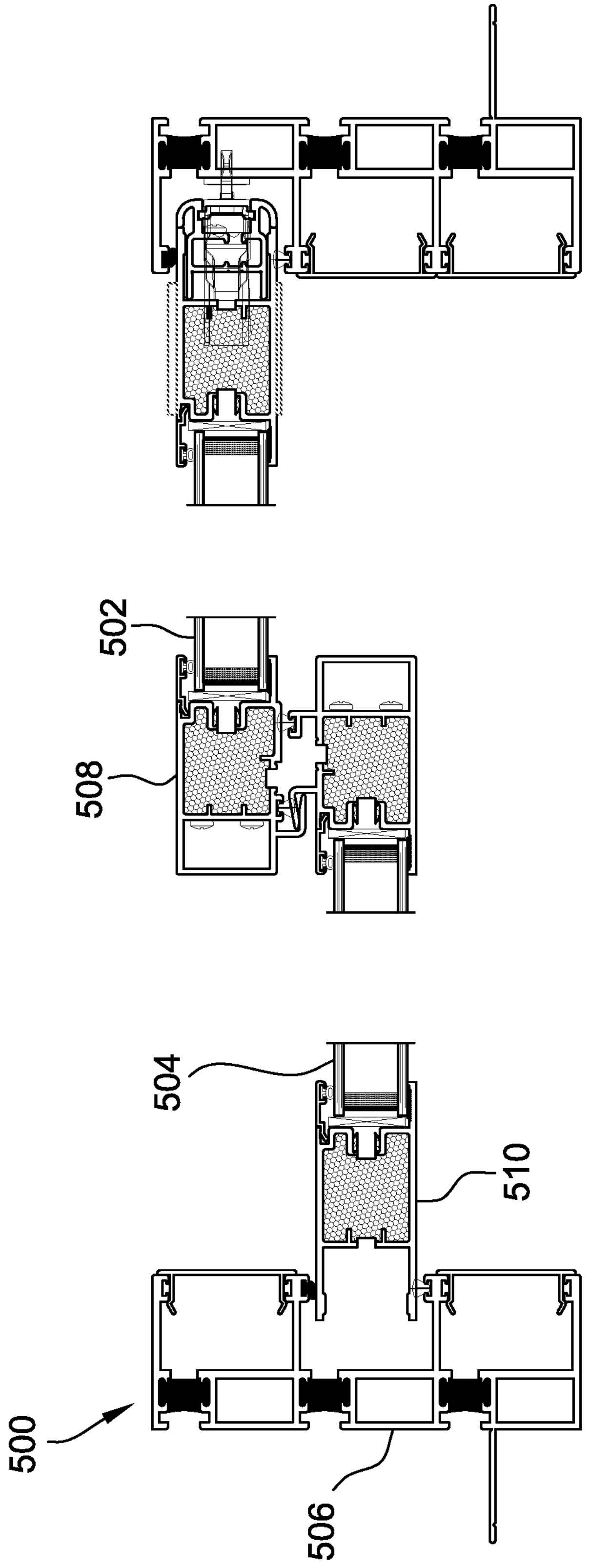
FIG. 20 is a sectional foreshortened view of the door shown in FIG. 18, taken along section line I-I.

In reference to FIGS. 18-20, a door 500 includes a first glass unit 502, a second glass unit 504, a frame 506, a first panel frame 508, and a second panel frame 510. The first panel frame 508 circumscribes the first glass unit 502. The second panel frame 510 circumscribes the second glass unit 504. In this embodiment, the first panel frame 508 and the first glass unit 502 are positioned in the frame 506 and arranged to slide relative to the frame along a first track 512. The second panel frame 510 and the second glass unit 504 are positioned in the frame 506 and arranged to slide relative to the frame along a second track 514. As shown and described, the door 500 of this embodiment is a sliding door, but in other embodiments, the door 400 may have any number of panels, and other configurations, that enable the door 300 to function as described.

The frame 506 includes a header 516, jambs 518, and a frame sill 520. The frame sill 520 is positioned on a sill flashing 522. The sill flashing 522 extends beyond the frame sill 520 and may be partially visible when the door 500 is interfaced with a floor. The frame sill 520 defines the first track 512 and the second track 514 and includes a seamless piece that spans a width of the first and second tracks.

Compared to conventional doors and windows, the doors and windows of embodiments of the present disclosure have several advantages. For example, embodiments of the doors and windows include headers, jambs, frame sills, and/or sill flashings that are seamless, single pieces and provide increased strength in comparison to conventional doors. In addition, the construction of the doors and windows prevent moisture intrusion through seams in the doors and windows. In addition, the doors and windows include a sill flashing and a frame sill that prevent moisture intrusion through a sill of the doors or window and simplify installation and/or repair of the doors or windows. The frame sill entirely covers the sill flashing and provides an improved aesthetic appearance for the doors and windows. Also, embodiments of the doors and windows include connecting features at the corners of the headers, jambs, and sills that simplify assembly of the doors and windows. For example, embodiments of the doors and windows may include pegs and corner blocks that align the header, jambs, and sills. In addition, the corner blocks may define channels that direct sealant into the corner joints. Moreover, embodiments of the door and window cost less to assemble than other types of doors and windows.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A fenestration unit comprising:

- a first glass unit;
- a first panel frame circumscribing the first glass unit;
- a second glass unit;
- a second panel frame circumscribing the second glass unit;
- a third glass unit;
- a third panel frame circumscribing the third glass unit;
- a frame circumscribing the first panel frame, the second panel frame, and the third panel frame, the frame including a header, jambs, and a frame sill including:
  - a first track,
  - a second track,
  - a third track, and
  - a first thermal break, a second thermal break, and a third thermal break, wherein each of the first thermal break, the second thermal break, and the third thermal break extend between portions of the frame and are each substantially filled with one or more insulating materials to reduce heat transfer,
    - wherein the first thermal break is aligned with the first track, the second thermal break is aligned with the second track, and the third thermal break is aligned with the third track; and
    - wherein the first panel frame and the first glass unit are slidable along the first track when positioned in the frame, wherein the second panel frame and the second glass unit are slidable along the second track when positioned in the frame, and the third panel frame and the third glass unit are slidable along the third track when positioned in the frame; and
- a sill flashing including a base extending under the first track, the second track, and the third track and a wall extending upward from the base to inhibit moisture intrusion through the fenestration unit, wherein the sill flashing is sized to extend beyond the frame sill when the frame sill is positioned on the sill flashing, and
- wherein the frame sill is removable from the frame without disassembling the sill flashing, the jambs, and the header.

2. The fenestration unit of claim 1, further comprising anchors positioned between the sill flashing and the frame sill to secure the frame sill in position.

3. The fenestration unit of claim 2, wherein the anchors, the frame sill, and the sill flashing are separate pieces.

4. The fenestration unit of claim 1, wherein the frame sill is not directly attached to the jambs.

5. The fenestration unit of claim 1, wherein the frame sill includes at least one seamless piece that spans a width of the first track and the second track, wherein the wall extends upward from an edge of the base, the edge of the base is beyond the frame sill.

6. The fenestration unit of claim 1, wherein the frame sill includes a plurality of seamless pieces that are attached together along at least one joint along a length of the fenestration unit.

7. The fenestration unit of claim 1 further comprising a fourth glass unit and a fourth panel frame circumscribing the fourth glass unit, wherein the frame sill includes a fourth track and a fourth thermal break, wherein the fourth thermal break is aligned with the fourth track, wherein the base of the sill flashing extends under the fourth track, and wherein the fourth panel frame and the fourth glass unit are slidable along the fourth track when positioned in the frame.

8. The fenestration unit of claim 1, in combination with a wall in which the fenestration unit is mounted and a floor abutting the wall, wherein the fenestration unit is a door and the frame sill and the sill flashing are arranged to interface with the floor.

9. The fenestration unit of claim 1, further comprising anchors.

10. The fenestration unit of claim 1, wherein the frame sill includes a plurality of seamless pieces.

11. The fenestration unit of claim 1, further comprising a fourth glass unit.

12. The fenestration unit of claim 11, further comprising a fourth panel frame.

13. The fenestration unit of claim 1, in combination with a wall in which the fenestration unit is mounted.

14. The fenestration unit of claim 13, wherein the wall of the sill flashing extends upward from an edge of the base, the edge of the base is beyond the frame sill.

15. The fenestration unit of claim 1, wherein the jambs are attached to the header at corner joints.

16. The fenestration unit of claim 15, wherein the jambs are attached to the header at the corner joints using at least one of:

corner blocks shaped to engage at least one of the header and the jambs and align the header and the jambs at each corner joint, the corner blocks defining channels for injection of sealant into the corner joints; or pegs shaped to fit into openings in one of the header, the jambs, and the corner blocks.

17. The fenestration unit of claim 1, wherein the frame includes sill corner blocks arranged to align the frame sill on the sill flashing.

* * * * *